US008329800B2

(12) United States Patent  
Terrenoire et al.

(10) Patent No.: US 8,329,800 B2  
(45) Date of Patent: Dec. 11, 2012

(54) BINDER COMPOSITIONS COMPRISING BORIC ACID OR BORIC ACID SALT

(75) Inventors: Alexandre Terrenoire, Mannheim (DE); Frank Reinhold, Mannheim (DE); Stephan Amthor, Ludwigshafen (DE); Michael Gross, Mannheim (DE); Konrad Roschmann, Ladenburg (DE); Stefan Becker, Mannheim (DE); Kamesh Vyakaranam, Freeport, TX (US); Jens Hartig, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/141,178

(22) PCT Filed: Dec. 21, 2009

(86) PCT No.: PCT/EP2009/067608  
§ 371 (c)(1), (2), (4) Date: Jun. 21, 2011

(87) PCT Pub. No.: WO2010/072697  
PCT Pub. Date: Jul. 1, 2010

(65) Prior Publication Data  
US 2011/0257302 A1   Oct. 20, 2011

(30) Foreign Application Priority Data  
Dec. 22, 2008   (EP) .................................... 08172579

(51) Int. Cl.  
*C08K 3/38* (2006.01)  
*C08K 3/00* (2006.01)

(52) U.S. Cl. .......................................... 524/405; 524/5

(58) Field of Classification Search .................. 524/405  
See application file for complete search history.

(56) References Cited

U.S. PATENT DOCUMENTS

| 4,544,699 | A | * | 10/1985 | Biale ............................ 524/512 |
| 2004/0254290 | A1 | | 12/2004 | Rodrigues et al. |
| 2006/0252877 | A1 | * | 11/2006 | Farwaha et al. ............... 524/556 |
| 2008/0004416 | A1 | | 1/2008 | Rodrigues et al. |
| 2008/0021151 | A1 | | 1/2008 | Rodrigues et al. |
| 2008/0214080 | A1 | | 9/2008 | Barcomb et al. |
| 2010/0175583 | A1 | | 7/2010 | Roschmann et al. |
| 2010/0255206 | A1 | | 10/2010 | Vandermeulen et al. |

FOREIGN PATENT DOCUMENTS

| EP | 1 134 240 | 9/2001 |
| EP | 1 419 897 | 5/2004 |
| EP | 1 486 516 | 12/2004 |
| EP | 1 964 887 | 9/2008 |
| WO | 2006 118745 | 11/2006 |

OTHER PUBLICATIONS

International Search Report Issued Apr. 6, 2010 in PCT/EP09/067608 filed Dec. 21, 2009.

* cited by examiner

*Primary Examiner* — Hui Chin  
(74) *Attorney, Agent, or Firm* — Oblon, Spivak, McClelland, Maier & Neustadt, L.L.P.

(57) ABSTRACT

An aqueous binder composition comprising: a) a water-insoluble polymer (P) in the form of dispersed polymer particles having a glass transition temperature in the range from −50° C. to 50° C., obtained by free-radical polymerization of ethylenically unsaturated monomers M, the monomers M comprising:
  80% to 99.9% by weight, based on the total amount of monomers M, of at least one neutral, monoethylenically unsaturated monomer M1 of low water-solubility; and
  0.1% to 20% by weight, based on the total amount of monomers M, of at least one monoethylenically unsaturated monomer M2 which carries at least one carboxyl group and/or at least one carboxamido group ($CONH_2$);
and b) boric acid and/or at least one salt of boric acid is provided. Also provided are a process to prepare the binder composition and the use thereof.

30 Claims, No Drawings

BINDER COMPOSITIONS COMPRISING BORIC ACID OR BORIC ACID SALT

The present invention relates to binder compositions which are based on polymer dispersions and comprise boric acid or salts of boric acid as crosslinking agents, to processes for preparing them, and to their uses.

Aqueous polymer dispersions which form polymer films when the aqueous dispersion medium is evaporated have found widespread use. They are used, for example, as aqueous binder systems in paints, in varnishes, in paper coating slips, in leather coating systems, in coating systems for mineral moldings such as fiber cement slabs and concrete roofing shingles, in anticorrosion primers for metals, as binders in nonwovens production, as base materials for adhesives, as additives for hydraulically setting compositions such as plaster or concrete, as additives for clay or loam construction materials, for producing membranes and the like. The solid polymer compositions in particle or powder form that are obtainable from such aqueous dispersions by drying may likewise be employed, and serve, moreover, as additives for a large multiplicity of application fields, such as for modifying plastics, as cement additives, as components of toner formulations, as additives in electrophotographic applications, and the like. Aqueous polymer dispersions of this kind are typically prepared by a free-radical aqueous emulsion polymerization of ethylenically unsaturated monomers.

It has emerged that polymer dispersions having crosslinked polymer chains possess properties that are advantageous for many of such applications. The polymer chains may be crosslinked either during or after the emulsion polymerization. The former is referred to as internal, the latter as external crosslinking. Examples of internal crosslinking are free-radical polymerizations of monounsaturated monomers in the presence of polyunsaturated monomers, which function as crosslinking agents.

EP 1 134 240 describes, for example, low-odor binder polymers which can be processed without solvent and are obtained by emulsion polymerization of ethylenically unsaturated monomers of which at least one is a crosslinking monomer having at least two nonconjugated vinyl groups.

For external crosslinking, it is usual to use polymers having certain functional or reactive groups which can be produced by means of appropriately modified monomers. Depending on the nature of the functional or reactive groups, crosslinking is brought about, subsequent to polymerization, by irradiation or by addition in particular of reactive or ionic additives. Zinc salts and calcium salts, in particular, find use as ionic crosslinking agents.

EP 1 419 897 describes recording materials for inkjet printers that have an ink-receiving layer comprising a water-soluble or water-dispersible polymer. The polymer contains a repeating monomer unit which is capable of chelating boric acid by means of a nitrogen-containing functional group and a hydroxyl group, by forming a 5- or 6-membered ring. The possible applications of the polymer dispersions described are very limited, and in particular they are not suitable as components of paints and adhesives.

U.S. Pat. No. 4,544,699 describes an adhesive composition comprising an aqueous dispersion of a copolymer, prepared from vinylidene chloride and a monomer having a hydroxyl group, and also a crosslinking agent, which can be boric acid or salts of boric acid. As a result of the high proportion of vinylidene chloride and the restriction to crosslinking mediated by hydroxyl groups, the compositions are suitable only for very specific adhesive applications.

It is an object of the present invention to provide binders that are based on aqueous polymer dispersions and have improved performance properties. These binders shall endow coating films—especially those produced with anticorrosive surface coating materials—with improved corrosion inhibition, and shall also enable adhesives to have optimized adhesion and cohesion properties.

Surprisingly it has been found that this object is achieved through the use of binder compositions which comprise polymers having COOH or $CONH_2$ groups and also boric acid or a boric salt.

The invention accordingly first provides an aqueous binder composition comprising
a) a water-insoluble polymer (P) in the form of dispersed polymer particles having a glass transition temperature in the range from −50° C. to 50° C., obtainable by free-radical polymerization of ethylenically unsaturated monomers M, the monomers M comprising:
  80% to 99.9% by weight, based on the total amount of monomers M, of at least one neutral, monoethylenically unsaturated monomer M1 of low water-solubility; and
  0.1% to 20% by weight, based on the total amount of monomers M, of at least one monoethylenically unsaturated monomer M2 which carries at least one carboxyl group and/or at least one carboxamido group ($CONH_2$); and
b) boric acid and/or at least one salt of boric acid.

The invention further provides a solid binder composition which comprises a water-insoluble polymer (P) as defined above, in the form of a powder, and also boric acid and/or at least one salt of boric acid.

The binder compositions of the invention are suitable for formulating anticorrosive surface coating materials featuring enhanced corrosion control. Through the use of the binder compositions of the invention, moreover, it is possible to obtain adhesives having generally good adhesion and cohesion properties that are advantageously harmonized with one another, said compositions enjoying high storage stability even in the form of one-component formulations. Moreover, the binder compositions of the invention endow cements with enhanced physical properties, especially improved strength, such as tensile and breaking strength, and enable coatings to have high adhesion and good abrasion resistance.

The present invention accordingly further provides for the use of a binder composition as defined above in surface coating materials.

The present invention further provides for the use of a binder composition as defined above in adhesives.

The present invention further provides for the use of a binder composition as defined above in cements.

The invention further provides for the uses of boric acid and/or at least one salt of boric acid to modify the properties of a polymer-bound coating comprising as binder a water-insoluble polymer (P), and also for the use of boric acid and/or at least one salt of boric acid to modify the properties of an adhesive which comprises a water-insoluble polymer (P).

In the adhesives or in the coating materials used to produce the coatings, said water-insoluble polymers are present in the form of dispersed polymer particles. The particulate polymers P are typically obtainable by free-radical aqueous emulsion polymerization of ethylenically unsaturated monomers M, the monomers M comprising the monomers specified above and below in the quantities indicated there.

The invention further provides processes for preparing the binder compositions of the invention, comprising the steps of
A) preparing an aqueous dispersion of a water-insoluble polymer (P) having a glass transition temperature in the range from −50° C. to 50° C. by free-radical polymerization of ethylenically unsaturated monomers M; and B) adding boric acid and/or at least one salt of boric acid to the polymer dispersion obtained in step A), or during its preparation.

Additionally provided by the invention are the preferentially used surface coating materials, adhesives, and cements that are described below and comprise a binder composition of the invention.

In the context of the present invention the expression "alkyl" comprises straight-chain and branched alkyl groups, especially having 1 to 30 carbon atoms, i.e., for "$C_1$-$C_{30}$ alkyl".

Suitable short-chain alkyl groups are, for example, straight-chain or branched $C_1$-$C_7$ alkyl, preferably $C_1$-$C_6$ alkyl, and more preferably $C_1$-$C_4$ alkyl groups. These include, in particular, methyl, ethyl, propyl, isopropyl, n-butyl, 2-butyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, etc.

Suitable longer-chain alkyl groups are, for example, straight-chain and branched $C_8$-$C_{30}$ alkyl groups, preferably $C_8$-$C_{20}$ alkyl groups. Preferably these are predominantly linear alkyl radicals, such as also occur in natural or synthetic fatty acids and fatty alcohols and also in oxo-process alcohols. They include, for example, n-octyl, n-nonyl, n-decyl, n-undecyl, n-dodecyl, n-tridecyl, n-tetradecyl, n-pentadecyl, n-hexadecyl, n-heptadecyl, n-octadecyl, and n-nonadecyl. The expression "alkyl" comprises unsubstituted and substituted alkyl radicals.

The above observations concerning alkyl also apply analogously to the alkyl groups in alkanol, alkylamine, and alkanecarboxylic acids.

The expression "alkylene" in the context of the present invention stands for straight-chain or branched alkanediyl groups having 1 to 7 carbon atoms, such as, for example, methylene, 1,2-ethylene, 1,2-propylene, 1,3-propylene, 1,2-butylene, 1,3-butylene, 1,4-butylene, 2-methyl-1,2-propylene, etc.

Primary carboxamides—both monoamides and diamides—in the context of this invention are compounds having one or two amide groups —$CONH_2$, where the nitrogen atom that is attached to the carbonyl carbon atom carries, apart from hydrogen, no further substituents.

The binder composition of the invention comprises a water-insoluble polymer (P) either, in the case of an aqueous composition, in the form of dispersed polymer particles or, in the case of a solid composition, in the form of a powder. The polymers (P) are obtainable by free-radical polymerization of ethylenically unsaturated monomers M. The monomers M comprise at least one neutral, monoethylenically unsaturated monomer M1 of low water-solubility, and at least one monoethylenically unsaturated monomer M2 which carries at least one COOH group and/or at least one $CONH_2$ group.

Boric acid in the context of this invention means the monomeric boric acid and also its oligomeric derivatives, especially diboric acid, triboric acid, cyclotriboric acid, tetraboric acid, pentaboric acid, hexaboric acid, decaboric acid, dodecaboric acid, and higher oligomers having generally up to 20 boron atoms. Boric salts, also called borates below, are here, correspondingly, the salts of boric acid, more particularly its alkali metal salts, alkaline earth metal salts, ammonium salts, alkylammonium salts, and hydroxyalkylammonium salts, which if appropriate may comprise further anions such as—for instance—halides. An alkylammonium salt here is a mono-, di-, tri- or tetraalkylammonium salt whose alkyl radicals independently of one another have 1 to 10 and preferably 1 to 4 C atoms. A hydroxyalkylammonium salt here is a mono-, di-, tri- or tetraalkylammonium salt whose alkyl radicals have 1 to 10 and preferably 1 to 4 C atoms, with one or more alkyl radicals carrying at least one hydroxyl group.

Monomers with low water-solubility are generally those monomers whose solubility in deionized water at 25° C. and 1 bar does not exceed 60 g/l and more particularly 30 g/l, and is situated typically in the range from 0.1 to 30 g/l (25° C., 1 bar).

The monomers M1 are neutral; that is, in an aqueous environment, they are neither protonated nor act as an acid.

The monomer M1 comprises a monoethylenically unsaturated double bond and is preferably selected from esters and diesters of α,β-ethylenically unsaturated monocarboxylic and dicarboxylic acids with $C_1$-$C_{30}$ alkanols, esters of vinyl alcohol or allyl alcohol with $C_1$-$C_{30}$ monocarboxylic acids, vinylaromatics, amides and diamides of α,β-ethylenically unsaturated monocarboxylic and dicarboxylic acids with $C_1$-$C_{30}$ alkylamines or di-$C_1$-$C_{30}$ alkylamines, and mixtures thereof.

Further suitable monomers M1 are, for example, vinyl halides, vinylidene halides, and mixtures thereof.

Suitable esters and diesters of α,β-ethylenically unsaturated monocarboxylic and dicarboxylic acids with $C_1$-$C_{30}$ alkanols are methyl(meth)acrylate, methyl ethacrylate, ethyl (meth)acrylate, ethyl ethacrylate, n-propyl(meth)acrylate, isopropyl(meth)acrylate, n-butyl(meth)acrylate, sec-butyl (meth)acrylate, tert-butyl(meth)acrylate, tert-butyl ethacrylate, n-hexyl(meth)acrylate, n-heptyl(meth)acrylate, n-octyl (meth)acrylate, 1,1,3,3-tetramethylbutyl(meth)acrylate, ethylhexyl(meth)acrylate, n-nonyl(meth)acrylate, n-decyl (meth)acrylate, n-undecyl(meth)acrylate, tridecyl(meth) acrylate, myristyl(meth)acrylate, pentadecyl(meth)acrylate, palmityl(meth)acrylate, heptadecyl(meth)acrylate, nonadecyl(meth)acrylate, arachidyl(meth)acrylate, behenyl(meth) acrylate, lignoceryl(meth)acrylate, cerotyl(meth)acrylate, melissyl(meth)acrylate, palmitoleyl(meth)acrylate, oleyl (meth)acrylate, linolyl(meth)acrylate, linolenyl(meth)acrylate, stearyl(meth)acrylate, lauryl(meth)acrylate, dimethyl maleate, diethyl(meth)maleate, di-n-propyl maleate, diisopropyl maleate, di-n-butyl maleate, di-n-hexyl maleate, di(1,1,3,3-tetramethylbutyl) maleate, di-n-nonyl maleate, ditridecyl maleate, dimyristyl maleate, dipentadecyl maleate, dipalmityl maleate, diarachidyl maleate, and mixtures thereof.

Suitable esters of vinyl alcohol and allyl alcohol with $C_1$-$C_{30}$ monocarboxylic acids are, for example, vinyl formate, vinyl acetate, vinyl propionate, vinyl butyrate, vinyl laurate, vinyl stearate, vinyl esters of Versatic acid, allyl formate, allyl acetate, allyl propionate, allyl butyrate, allyl laurate, and mixtures thereof.

Suitable vinylaromatics are styrene, 2-methylstyrene, 4-methylstyrene, 2-n-butylstyrene, 4-n-butylstyrene, 4-n-decylstyrene, especially styrene.

Suitable amides and diamides of α,β-ethylenically unsaturated monocarboxylic and dicarboxylic acids with $C_1$-$C_{30}$ alkylamines or di-$C_1$-$C_{30}$ alkylamines are N-methyl(meth) acrylamide, N-ethyl(meth)acrylamide, N-propyl(meth)acrylamide, N-(n-butyl)(meth)acrylamide, N-(tert-butyl)(meth) acrylamide, N-(n-octyl)(meth)-acrylamide, N-(1,1,3,3-tetramethylbutyl)(meth)acrylamide, N-ethylhexyl(meth)- acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)-acrylamide, N-pentadecyl(meth)acrylamide, N-palmityl(meth)acrylamide, N-heptadecyl(meth)acrylamide, N-nonadecyl(meth)acrylamide, N-arachidyl(meth)-acrylamide, N-behenyl(meth)acrylamide, N-lignoceryl(meth)acrylamide, N-cerotyl-(meth)acrylamide, N-melissyl(meth)acrylamide, N-palmitoleyl(meth)acrylamide, N-oleyl(meth)acrylamide, N-linolyl(meth)acrylamide, N-linolenyl(meth)acrylamide, N-stearyl(meth)acrylamide, N-lauryl(meth)acrylamide, N,N-dimethyl(meth)acrylamide, N,N-diethyl(meth)acrylamide, morpholinyl(meth)acrylamide, N,N'-dimethylmaleamide, N,N'-diethylmaleamide, N,N'-dipropylmaleamide, N,N'-di-(tert-butyl)maleamide, N,N'-di-(n-octyl)maleamide, N,N'-di-(n-nonyl)maleamide, N,N'-ditridecylmaleamide, N,N'-dimyristylmaleamide, N,N,N',N'-tetramethylmaleamide, N,N,N',N'-tetraethylmaleamide, and mixtures thereof.

Suitable vinyl halides and vinylidene halides are vinyl chloride, vinylidene chloride, vinyl fluoride, vinylidene fluoride, and mixtures thereof.

The at least one monomer M1 is preferably selected from esters of α,β-ethylenically unsaturated carboxylic acids with $C_1$-$C_{10}$ alkanols and vinylaromatics, more particularly from $C_1$-$C_{10}$ alkylacrylates and $C_1$-$C_{10}$ alkylmethacrylates, vinylaromatics and $C_1$-$C_{10}$ alkylcarbonitriles, and especially from methyl acrylate, n-butyl acrylate, ethylhexyl acrylate, methyl methacrylate, styrene, and acrylonitrile.

Corresponding to one preferred embodiment of the invention, the polymer (P) comprises in copolymerized form at least one monomer M1 and in particular at least two monomers M1 which are selected from esters of α,β-ethylenically unsaturated carboxylic acids with $C_1$-$C_{30}$ alkanols and vinylaromatics. Corresponding to one particularly preferred embodiment, the polymer (P) comprises in copolymerized form at least one monomer M1.1 and at least one monomer M1.2, the at least one monomer M1.1 being selected from $C_1$-$C_{10}$ alkylacrylates and preferably from methyl acrylate, n-butyl acrylate, and ethylhexyl acrylate, and the at least one monomer M1.2 being selected from $C_1$-$C_{10}$ alkyl methacrylates and vinylaromatics, and preferably from methyl methacrylate and styrene.

The fraction of the monomers M1, based on the total amount of the monomers M, is preferably in the range from 80% to 99.9% by weight, more particularly in the range from 85% to 99.9% by weight, and more preferably in the range from 90% to 99.5% by weight.

Furthermore, particularly for applications in cements, in surface coating materials, and in adhesives for rigid floorcoverings, such as woodblock flooring, for instance, polymers (P) are preferred in which the weight ratio of copolymerized monomers M1.1 and M1.2 is situated in the range from 25:1 to 1:20, preferably in the range from 15:1 to 1:10, and especially in the range from 5:1 to 1:3. For applications in adhesives for flexible floorcoverings, in particular, polymers (P) are preferred which comprise 50% to 100% by weight and preferably 80% to 100% by weight of monomers M1.1 and also 0% to 50% by weight and preferably 0% to 20% by weight of monomers M1.2 in copolymerized form.

In accordance with the invention the monomers M2 are selected from monoethylenically unsaturated monomers M2.1 having at least one, e.g., 1, 2 or 3 carboxyl groups (—COOH), and monoethylenically unsaturated monomers M2.2 having at least one, e.g. 1, 2 or 3 carboxamido groups (—COONH$_2$). For preparing the polymers (P), the monomers M2.1 may also be used in the form of their salts and also, in the case of the dicarboxylic or tricarboxylic acids, in the form of their anhydrides.

Monomers M2.1 are preferably selected from monoethylenically unsaturated $C_3$-$C_8$ monocarboxylic and $C_4$-$C_8$ dicarboxylic acids.

Monomers M2.2 are preferably selected from primary amides of monoethylenically unsaturated $C_3$-$C_8$ monocarboxylic acids.

Suitable monoethylenically unsaturated $C_3$-$C_8$ monocarboxylic, $C_3$-$C_8$ dicarboxylic, and $C_3$-$C_8$ tricarboxylic acids are, for example, acrylic acid, methacrylic acid, ethacrylic acid, α-chloroacrylic acid, crotonic acid, maleic acid, itaconic acid, citraconic acid, mesaconic acid, glutaconic acid, aconitic acid, fumaric acid, the monoesters of monoethylenically unsaturated dicarboxylic acids having 4 to 10, preferably 4 to 6, C atoms, e.g., monomethyl maleate. Particular preference is given to acrylic acid, methacrylic acid, and mixtures thereof.

Suitable primary amides of monoethylenically unsaturated $C_3$-$C_8$ monocarboxylic and $C_3$-$C_8$ dicarboxylic acids are, in particular, acrylamide, methacrylamide, maleamide, fumaramide, and mixtures thereof.

The at least one monomer M2 is preferably selected from monoethylenically unsaturated $C_3$-$C_8$ monocarboxylic acids and primary amides of monoethylenically unsaturated $C_3$-$C_8$ monocarboxylic acids, especially from acrylic acid, methacrylic acid, acrylamide, and methacrylamide, and in particular from acrylic acid and acrylamide.

Corresponding to one preferred embodiment, the at least one monomer M2 comprises at least one monomer M2.1, preferably having a carboxyl group, and, if appropriate, at least one monomer M2.2. In one particularly preferred embodiment M2 comprises not only at least one monomer M2.1 having a carboxyl group but also at least one monomer M2.2. In another preferred embodiment M2 comprises at least one monomer M2.2.

Corresponding to a further preferred embodiment of the invention, the polymer (P) comprises in copolymerized form at least two monomers M2 which are selected from monoethylenically unsaturated $C_3$-$C_8$ monocarboxylic acids and monoethylenically unsaturated primary $C_3$-$C_8$ monocarboxamides. Corresponding to one particularly preferred embodiment, the polymer (P) comprises in copolymerized form at least one monomer M2.1 and at least one monomer M2.2, the at least one monomer M2.1 being preferably selected from monoethylenically unsaturated $C_3$-$C_8$ monocarboxylic acids, and more particularly from $C_3$-$C_8$ alkenoic acids, and the at least one monomer M2.2 being preferably selected from primary amides of monoethylenically unsaturated $C_3$-$C_8$ monocarboxylic acids, and more particularly from $C_3$-$C_8$ alkenamides.

Preferred polymers (P) are those in which the fraction of the monomers M2 is situated in the range from 0.1% to 20% by weight, more preferably in the range from 0.2% to 15% by weight, and more particularly in the range from 0.5% to 10% by weight, based in each case on the total weight of the monomers M used for the polymerization. The weight ratio of the monomers M2.1 and M2.2 that are copolymerized in polymers (P) will typically be situated in the range from 25:1 to 1:50, preferably in the range from 10:1 to 1:20, and more particularly in the range from 2:1 to 1:4.

The monomers M may, further to the monomers M1 and M2, comprise at least one monomer M3 which is selected from monoethylenically unsaturated monomers M3.1 which comprise a hydroxyl group, monoethylenically unsaturated monomers M3.2 which comprise at least one urea group, and monoethylenically unsaturated monomers M3.3 which carry at least one oligo- or poly-$C_2$-$C_4$ alkylene ether group.

The fraction of the monomers M3, based on the total amount of the monomers M, is situated typically in the range from 0% to 19.9% by weight, more particularly in the range from 0% to 14.8% by weight, and especially in the range from 0% to 9.5% by weight, e.g., in the range from 0.1% to 19.9% by weight, more particularly in the range from 0.2% to 14.8% by weight, and especially in the range from 0.5% to 9.5% by weight.

Monomers M3.1 are preferably selected from hydroxyalkyl esters of monoethylenically unsaturated monocarboxylic acids and hydroxyalkylamides of monoethylenically unsaturated monocarboxylic acids.

Suitable hydroxyalkyl esters of monoethylenically unsaturated monocarboxylic acids are, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, and mixtures thereof.

Suitable hydroxyalkylamides of monoethylenically unsaturated monocarboxylic acids are, for example, N-(2-hydroxyethyl)acrylamide, N-(2-hydroxyethyl)methacrylamide, N-(2-hydroxyethyl)ethacrylamide, N-(2-hydroxypropyl)acrylamide, N-(2-hydroxypropyl)methacrylamide, N-(3-hydroxypropyl)acrylamide, N-(3-hydroxypropyl)methacrylamide, N-(3-hydroxybutyl)acrylamide, N-(3-hydroxybutyl)methacrylamide, N-(4-hydroxybutyl)acrylamide, N-(4-hydroxybutyl)methacrylamide, N-(6-hydroxyhexyl)acrylamide, N-(6-hydroxyhexyl)-methacrylamide, N-(3-hydroxy-2-ethylhexyl)acrylamide, N-(3-hydroxy-2-ethylhexyl)methacrylamide, N-methyl-N-(2-hydroxyethyl)acrylamide, N-methyl-N-(2-hydroxyethyl)methacrylamide, N-methyl-N-(2-hydroxyethyl)ethacrylamide, N-methyl-N-(2-hydroxypropyl)acrylamide, N-methyl-N-(2-hydroxypropyl)methacrylamide, N-methyl-N-(3-hydroxypropyl)acrylamide, N-methyl-N-(3-hydroxypropyl)methacrylamide, N-methyl-N-(3-hydroxybutyl)acrylamide, N-methyl-N-(3-hydroxybutyl)methacrylamide, N-methyl-N-(4-hydroxybutyl)acrylamide, N-methyl-N-(4-hydroxybutyl)methacrylamide, N-methyl-N-6-hydroxyhexyl)acrylamide, N-methyl-N-(6-hydroxyhexyl)methacrylamide, N-methyl-N-(3-hydroxy-2-ethylhexyl)acrylamide, N-methyl-N-(3-hydroxy-2-ethylhexyl)methacrylamide, and mixtures thereof.

Suitable monomers M3.2 are, for example, N-vinylurea, N-(2-acryloyloxyethyl)-imidazolidin-2-one and N-(2-methacryloyloxyethyl)imidazolidin-2-one (2-ureidomethacrylate, UMA).

Suitable monomers M3.3 are, for example, the monoesters of monoethylenically unsaturated carboxylic acids with oligo- and/or poly-$C_2$-$C_4$ alkylene ethers of the general formula (A)

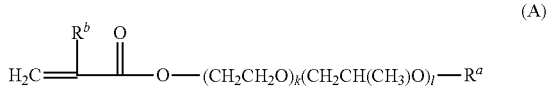

in which
the sequence of the alkylene oxide units is arbitrary,
k and l independently of one another are each an integer in the range from 0 to 100, preferably in the range from 0 to 50, and more particularly in the range from 0 to 50, the sum of k and l being at least 3, more particularly 4, e.g., 3 to 200, and more particularly 4 to 100,
$R^a$ is hydrogen, $C_1$-$C_{30}$ alkyl, $C_5$-$C_8$ cycloalkyl or $C_6$-$C_{14}$ aryl, and
$R^b$ is hydrogen or $C_1$-$C_8$ alkyl, more particularly hydrogen or methyl.

Preferably k is an integer from 3 to 50, more particularly 4 to 30. Preferably l is an integer from 0 to 30, more particularly 0 to 20. More preferably l is 0. More preferably the sum of k and l is situated in the range from 3 to 50 and more particularly in the range from 4 to 40.

$R^a$ in the formula (A) is preferably hydrogen, $C_1$-$C_{20}$ alkyl, e.g., methyl, ethyl, n-propyl, isopropyl, n-butyl or sec-butyl, n-pentyl, n-hexyl, octyl, 2-ethylhexyl, decyl, lauryl, palmityl or stearyl. $R^a$ is more preferably hydrogen or $C_1$-$C_4$ alkyl.

$R^b$ is preferably hydrogen or methyl.

The at least one monomer M3 is preferably selected from the M3.1 monomers hydroxy-$C_2$-$C_4$ alkyl esters of $C_3$-$C_5$ alkenoic acids, the M3.2 monomer 2-ureidomethacrylate, and the monomers M3.3 of the general formula (A')

in which
k is an integer from 4 to 40, $R^a$ is hydrogen or $C_1$-$C_4$ alkyl, and $R^b$ is hydrogen or methyl.

Preferred polymers (P) are obtainable by means of a polymerization in which the fraction of the monomers M3.1 is situated in the range from 0% to 19.9% by weight, more particularly in the range from 0% to 14.8% by weight, and especially in the range from 0% to 9.5% by weight, e.g., in the range from 0.1% to 19.9% by weight, more particularly in the range from 0.1% to 14.8% by weight, and especially in the range from 0.2% to 9.5% by weight, based on the total amount of the monomers M.

Furthermore, preferred polymers (P) are those for which the fraction of the monomers M3.2 is situated in the range from 0% to 19.9% by weight, more particularly in the range from 0% to 14.8% by weight, and especially in the range from 0% to 9.5% by weight, e.g., in the range from 0.1% to 19.9% by weight, more particularly in the range from 0.1% to 14.8% by weight, and especially in the range from 0.2% to 9.5% by weight, based on the total amount of the monomers M.

Preferred polymers (P) are, moreover, those for which the fraction of the monomers M3.3 is situated in the range from 0% to 19.9% by weight, more particularly in the range from 0% to 14.8% by weight, and especially in the range from 0% to 9.5% by weight, e.g., in the range from 0.1% to 19.9% by weight, more particularly in the range from 0.1% to 14.8% by weight, and especially in the range from 0.2% to 9.5% by weight, based on the total amount of the monomers M.

Besides the aforementioned monoethylenically unsaturated monomers, the polymer (P) used in accordance with the invention may also comprise small amounts of polyethylenically unsaturated monomers, which in the preparation of the polymer lead to internal crosslinking. The fraction of such monomers, however, will not exceed generally 1% by weight, more particularly 0.5% by weight, and especially 0.1% by weight, based on the total amount of the monomers M that constitute the polymer. Examples of polyethylenically unsaturated monomers are diesters and triesters of ethylenically unsaturated carboxylic acids, more particularly the bisacrylates of diols and triols and the trisacrylates of triols and tetraols, e.g., the bisacrylates and the bismethacrylates of ethylene glycol, diethylene glycol, triethylene glycol, neopentyl glycol or polyethylene glycols, vinyl and allyl esters of saturated or unsaturated dicarboxylic acids, vinyl and allyl esters of monoethylenically unsaturated monocarboxylic acids, and also N,N-diallylamines with hydrogen or an alkyl group as further substituents on the nitrogen, especially N,N-diallylamine and N,N-diallyl-N-methylamine. Preferably, however, the polymer (P) used in accordance with the invention does not comprise any polyethylenically unsaturated monomers.

Further suitable monomers M are, for example, monoethylenically unsaturated phosphonic and sulfonic acids, e.g., vinylphosphonic acid and allylphosphonic acid, vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, and 2-acrylamido-2-methylpropanesulfonic acid, styrenesulfonic acids and their derivatives, such as styrene-4-sulfonic acid and styrene-3-sulfonic acid, for instance, and also the salts, especially the alkaline earth metal salts or alkali metal salts, of the aforementioned acids, such as sodium styrene-3-sulfonate and sodium styrene-4-sulfonate, for instance.

The fraction of monomers M, which are phosphonic acids, sulfonic acids or salts thereof, based on the total amount of the monomers M, is situated in the range from 0% to 2% by weight and is preferably ≦0.1% by weight.

In one preferred embodiment of the present invention the polymer, based on the total amount of the monomers M, is composed of at least 98% by weight, more particularly at least 99.5% by weight, and especially at least 99.9% by weight, or 100% by weight, of monoethylenically unsaturated monomers M, the monomers M in this case preferably comprising the following monomers:

80% to 99.9% by weight, frequently 85% to 99.9% by weight, more particularly 90% to 99.9% by weight, and especially 90% to 99.5% by weight of monomers M1 which are selected from neutral, monoethylenically unsaturated monomers of low water-solubility, and more particularly from esters of α,β-ethylenically unsaturated carboxylic acids with $C_1$-$C_{30}$ alkanols and vinylaromatics;

0.1% to 20% by weight, frequently 0.2% to 15% by weight, more particularly 0.5% to 10% by weight, and especially 0.5% to 8% by weight of monomers M2 which are selected from monoethylenically unsaturated monomers having at least one carboxyl group and/or at least one carboxamido group ($CONH_2$), and more particularly from monoethylenically unsaturated $C_3$-$C_8$ monocarboxylic acids and/or primary amides of monoethylenically unsaturated $C_3$-$C_8$ monocarboxylic acids, and mixtures thereof;

and also, optionally:

0% to 19.9% by weight, more particularly 0% to 14.8% by weight, and especially 0% to 9.5% by weight of monomers M3.1, e.g., 0.1% to 19.9% by weight, more particularly 0.1% to 14.8% by weight, and especially from 0.2% to 9.5% by weight, which are selected from monoethylenically unsaturated monomers having one hydroxyl group, and more particularly from hydroxy-$C_2$-$C_4$ alkyl esters of $C_3$-$C_5$ alkenoic acids;

and/or:

0% to 19.9% by weight, more particularly 0% to 14.8% by weight, and especially 0% to 9.5% by weight of monomers M3.2, e.g., 0.1% to 19.9% by weight, more particularly 0.1% to 14.8% by weight, and especially from 0.2% to 9.5% by weight, which are selected from monoethylenically unsaturated monomers having at least one urea group, more particularly from N-(2-acryloyloxyethyl)imidazolidin-2-one and N-(2-methacryloyloxyethyl)imidazolidin-2-;

and/or:

0% to 19.9% by weight, more particularly 0% to 14.8% by weight, and especially 0% to 9.5% by weight of monomers M3.3, e.g., 0.1% to 19.9% by weight, more particularly 0.1% to 14.8% by weight, and especially from 0.2% to 9.5% by weight, which are selected from monoethylenically unsaturated monomers having at least one oligo- or poly-$C_2$-$C_4$ alkylene ether group, more particularly from the aforementioned monomers of the general formula (A');

the total amount of monomers M3 being typically ≦20% by weight, more particularly ≦15% by weight, and especially ≦10% by weight, e.g., 0.1% to 19.9% by weight, more particularly 0.1% to 14.8% by weight, and especially from 0.2% to 9.5% by weight, when the monomers M comprise one or more monomers M3.

In addition to the polymer, the aqueous polymer dispersions typically further comprise at least one surface-active substance for the purpose of stabilizing the polymer particles. These substances include ionic and nonionic emulsifiers and also ionic and nonionic protective colloids or stabilizers. Emulsifiers, in contrast to protective colloids, are surface-active substances whose molecular weight (numerical average) is situated typically below 2000 g/mol and especially below 1500 g/mol. Protective colloids in turn are typically water-soluble polymers having a number-average molecular weight of more than 2000 g/mol, e.g., in the range from 2000 to 100 000 g/mol, and more particularly in the range from 5000 to 50 000 g/mol. It is of course possible to use protective colloids and emulsifiers in a mixture.

The amount of surface-active substance is situated typically in the range from 0.1% to 10% by weight, preferably 0.2% to 5% by weight, based on 100% by weight of polymer, or on 100% by weight of the monomers M that constitute the polymer.

The polymer dispersions used in accordance with the invention preferably comprise exclusively emulsifiers. In particular it has been found appropriate for the polymer dispersion to comprise a combination of at least one anionic and at least one nonionic emulsifier as surface-active substances. The emulsifiers are in general not polymerizable—that is, they contain no ethylenically unsaturated groups that are polymerizable in a free-radical polymerization. Part or the entirety of the emulsifiers, however, may be polymerizable. Polymerizable emulsifiers of this kind comprise ethylenically unsaturated groups and are either nonionic or anionic emulsifiers. Polymerizable nonionic emulsifiers are preferably selected from $C_2$-$C_3$ alkoxylates of alkenols, more particularly of prop-2-en-1-ol, and monoesters of monoethylenically unsaturated monocarboxylic or dicarboxylic acids with poly-$C_2$-$C_3$ alkylene ethers, the degree of alkoxylation being 3 to 100 in each case. Polymerizable anionic emulsifiers are preferably selected from the corresponding sulfuric and phosphoric monoesters of the aforementioned nonionic polymerizable emulsifiers.

The nonpolymerizable anionic emulsifiers typically include aliphatic carboxylic acids having in general at least 10

C atoms, and also their salts, more particularly their ammonium salts and alkali metal salts, aliphatic, araliphatic, and aromatic sulfonic acids having generally at least 6 C atoms, and also their salts, more particularly their ammonium salts and alkali metal salts, sulfuric monoesters with ethoxylated alkanols and alkylphenols, and also their salts, more particularly their ammonium salts and alkali metal salts, and also alkyl, aralkyl, and aryl phosphates, including phosphoric monoesters of alkanols and alkylphenols.

Examples of suitable anionic emulsifiers are as follows: alkali metal salts of dialkyl esters of sulfosuccinic acid and also alkali metal salts and ammonium salts of alkyl sulfates (alkyl radical: $C_8$ to $C_{12}$), of sulfuric monoesters with ethoxylated alkanols (EO degree: 4 to 30, alkyl radical: $C_{12}$ to $C_{18}$), of sulfuric monoesters with ethoxylated alkyl phenols (EO degree: 3 to 50, alkyl radical: $C_4$ to $C_9$), of alkylsulfonic acids (alkyl radical: $C_{12}$ to $C_{18}$), and of alkylarylsulfonic acids (alkyl radical: $C_9$ to $C_{18}$). Examples of suitable emulsifiers are also the below-specified compounds of the general formula

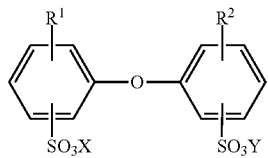

in which $R^1$ and $R^2$ are hydrogen or $C_4$ to $C_{14}$ alkyl and are not simultaneously hydrogen, and X and Y may be alkali metal ions and/or ammonium ions. Preferably $R^1$ and $R^2$ are hydrogen or linear or branched alkyl radicals having 6 to 18 C atoms and more particularly having 6, 12 and 16 C atoms, $R^1$ and $R^2$ not both simultaneously being hydrogen. X and Y are preferably sodium, potassium or ammonium ions, with sodium being particularly preferred. Particularly advantageous compounds are those in which X and Y are sodium, $R^1$ is a branched alkyl radical having 12 C atoms, and $R^2$ is hydrogen or has one of the non-hydrogen definitions stated for $R^1$. Frequently, technical mixtures are used which contain a fraction of 50% to 90% by weight of the monoalkylated product, for example, Dowfax® 2A1 (trade mark of the Dow Chemical Company).

Suitable nonionic emulsifiers are typically ethoxylated alkanols having 8 to 36 C atoms in the alkyl radical, ethoxylated mono-, di-, and trialkylphenols having typically 4 to 12 C atoms in the alkyl radicals, the ethoxylated alkanols and alkylphenols typically having a degree of ethoxylation in the range from 3 to 50.

Further suitable emulsifiers are found, for example, in Houben-Weyl, Methoden der organischen Chemie, Volume 14/1, Makromolekulare Stoffe [Macromolecular compounds], Georg Thieme Verlag, Stuttgart, 1961, pp. 192 to 208.

In accordance with the invention the polymer dispersions in question are aqueous, i.e., the polymer is present as a heterogeneous phase in the form of finely divided particles of a homogeneous aqueous phase. The homogeneous aqueous phase may, besides water and also the auxiliaries that are typically used for the preparation, such as surface-active substances, acids, bases, and decomposition products from the polymerization reaction, further comprise small amounts of water-miscible organic solvents. The fraction of the last-mentioned components will typically not exceed 1% by weight, based on the total weight of the dispersion.

The in the aqueous polymer dispersion may constitute the direct product of a free-radical aqueous emulsion polymerization, or may constitute a secondary dispersion. In this context, the free-radical aqueous emulsion polymerization may also be carried out as what is called a miniemulsion polymerization; that is, the monomers for polymerization are used in the form of an aqueous miniemulsion in which the monomer droplets have very small diameters (volume-average droplet diameter of the monomer emulsion <1 μm, more particularly <0.6 μm). A secondary dispersion is an aqueous polymer dispersion whose polymer is first prepared in a solution polymerization or in some other way and is then dispersed or emulsified in an aqueous medium, optionally with removal of organic solvent from the solution polymerization. With an eye to the applications, polymer dispersions are preferred that have been prepared by means of free-radical aqueous emulsion polymerization.

For the polymer dispersions used in accordance with the invention it has proven advantageous to employ the below-described process of a free-radical aqueous emulsion polymerization of the monomers M that constitute the polymer (P). With this process a free-radical aqueous emulsion polymerization of the ethylenically unsaturated monomers M is carried out according to a monomer feed process, in which, preferably, at least one particulate seed polymer is introduced in the initial charge in the polymerization reactor. "Introduce in the initial charge" in this context means that the seed polymer either is added before the beginning of the polymerization or is formed in the polymerization reactor before the actual emulsion polymerization, by means of emulsion polymerization in situ.

A monomer feed process means, here and below, that at least 90% and more particularly at least 95% of the monomers to be polymerized are charged under polymerization conditions to a polymerization reactor which already contains a first particulate seed polymer, typically in the form of an aqueous dispersion of the seed polymer.

The skilled worker understands the term "seed polymer" to refer to a finely divided polymer in the form of an aqueous polymer dispersion. The weight-average particle size of the seed polymers used in the process of the invention (weight average, $d_{50}$) is typically below 200 nm, frequently in the range from 10 to 150 nm, and more particularly in the range from 20 to 120 nm. The monomer composition of the seed polymers is of minor importance. Suitability is possessed both by seed polymers which are constructed predominantly of vinylaromatic monomers, and more particularly of styrene (so-called styrene seed), and by seed polymers which are composed predominantly of $C_1$-$C_{10}$ alkylacrylates and/or $C_1$-$C_{10}$ alkylmethacrylates, such as of a mixture of butyl acrylate and methyl methacrylate, for example. Besides these principal monomers, which account typically for at least 80% and more particularly at least 90% by weight of the seed polymer, the seed polymers may also comprise, in copolymerized form, different monomers, more particularly those having an increased water-solubility, examples being monomers having at least one acid function and/or neutral monomers with increased water-solubility. The fraction of such monomers will generally not exceed 20% and more particularly 10% by weight, and is situated, where present, typically in the range from 0.1% to 10% by weight, based on the total amount of the monomers that constitute the seed polymer.

The free-radical aqueous emulsion polymerization is performed typically in the presence of surface-active substances as described above. In the process of the invention it is preferred to use exclusively emulsifiers. More particularly it has been found appropriate to use a combination of at least one anionic and at least one nonionic emulsifier as surface-active substance.

Typically the surface-active substances are used in amounts of 0.1% to 10% by weight, more particularly in amounts of 0.2% to 5% by weight, based on the weight of the monomers M to be polymerized.

The initiators used for the free-radical emulsion polymerization are typically water-soluble substances that form free radicals.

Water-soluble initiators for the emulsion polymerization are organic or inorganic peroxide compounds, i.e., compounds having at least one peroxide or hydroperoxide group, examples being ammonium salts and alkali metal salts of peroxodisulfuric acid, e.g., sodium peroxodisulfate, or hydrogen peroxide or organic peroxides, e.g., tert-butyl hydroperoxide.

Also suitable are what are called reduction-oxidation (redox) initiator systems. The redox initiator systems are composed of at least one, usually inorganic reducing agent and one organic or inorganic oxidizing agent. The oxidizing component comprises, for example, the peroxide compounds already stated above. The reducing components comprise, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems can be used in combination with soluble metal compounds whose metallic component is able to exist in a plurality of valence states. Typical redox initiator systems are exemplified by ascorbic acid/iron(II) sulfate/sodium peroxodisulfate, tert-butyl hydroperoxide/sodium disulfite, and tert-butyl hydroperoxide/Na hydroxymethanesulfinate. The individual components, the reducing component, for example, may also be mixtures, an example being a mixture of the sodium salt of hydroxymethanesulfinic acid with sodium disulfite.

The stated initiators are used mostly in the form of aqueous solutions, the lower concentration being determined by the amount of water that is acceptable in the dispersion, and the upper concentration by the solubility of the respective compound in water. Generally speaking, the concentration is 0.1% to 30%, preferably 0.5% to 20%, more preferably 1.0% to 10%, by weight, based on the solution.

The amount of initiators is generally 0.1% to 10% by weight, preferably 0.2% to 5% by weight, based on the monomers to be polymerized. It is also possible for two or more different initiators to be used for the emulsion polymerization.

In the polymerization it is possible to use regulators, in amounts of 0% to 1% by weight, for example, based on the monomers M to be polymerized. By this means the molar mass of the polymer is reduced. Suitability is possessed, for example, by compounds having a thiol group such as tert-butyl mercaptan, mercaptoethanol, thioglycolic acid, ethyl thioglycolate, mercaptopropyltrimethoxysilane, and tert-dodecyl mercaptan. If appropriate it is of advantage to add the regulator in the course of the polymerization over a relatively long period, parallel, for example, with the addition of the monomers M. The addition may then be made at a continuous feed rate or with an increasing or decreasing feed rate.

The process of the invention is performed as a feed process, i.e., at least 90% of the monomers M to be polymerized are added to the polymerization reactor in the course of the polymerization under polymerization conditions. The addition may be made continuously or in stages. In the course of the polymerization the monomer composition may be altered once, a number of times or else continuously (gradient procedure).

A preferred procedure in the process of the invention is to introduce in the initial charge an externally produced seed polymer in the form of an aqueous dispersion, together if appropriate with water. Alternatively the seed polymer can be prepared beforehand in situ by emulsion polymerization, preferably using a small portion of the monomers M. Following initial introduction or synthesis of the seed polymer, the initial charge is heated to polymerization temperature, if this has not already taken place, and then a portion of the polymerization initiator is added, e.g., 1% to 20% and more particularly 5% to 15% by weight, based on the total amount of the initiator. An alternative procedure is first to add the portion of the polymerization initiator and then to carry out heating to polymerization temperature. At this point the polymerization reactor preferably receives less than 5% by weight of the monomers M to be polymerized. Subsequently the addition takes place of the monomers to be polymerized to the polymerization reactor under polymerization conditions. The addition is performed typically over a relatively long period of at least 30 minutes, 30 minutes to 10 hours for example, more particularly over a period of 1 h to 6 h. As already outlined, the addition may be performed with a constant, increasing or decreasing rate of addition. In a first preferred embodiment the addition is made at the beginning of the polymerization with increasing feed rate. In another, likewise preferred embodiment of the process of the invention, the addition is made at a constant rate of addition. The monomers can be added as they are. Preferably the monomers are added in the form of an aqueous monomer emulsion which typically comprises at least part, preferably at least 70% by weight, of the surface-active substances used in the emulsion polymerization. This monomer emulsion typically has a monomer content in the range from 60% to 85% by weight and more particularly in the range from 65% to 80% by weight. It is possible in principle to add the monomers or the monomer emulsion to the polymerization reactor by way of two or more feeds, in which case the monomer composition of the individual feeds may differ. In general, however, it is sufficient to add the monomers as a mixture via one feed to the polymerization reactor. Where the monomers are added in the form of an aqueous emulsion to the polymerization reactor, it can be of advantage to emulsify the monomers afresh directly before they are added and at the rate at which they are added in the polymerization reactor, by a continuous process, for example. The monomer emulsion can also be first prepared and then introduced at the desired rate of addition into the polymerization reactor.

Typically, parallel to the addition of monomer, at least a portion or the entirety of the polymerization initiator is added. At least 80% of the polymerization initiator needed for the emulsion polymerization is typically added, more particularly 85% to 95% of the polymerization initiator, to the polymerization reactor in the course of the polymerization reaction. The polymerization initiator may be added with a constant rate of addition or with a changing rate of addition—for example, a decreasing or increasing rate.

Polymerization temperature and polymerization pressure are of minor importance. The emulsion polymerization takes place typically at temperatures in the range from 30 to 130, preferably in the range from 50 to 100° C. The polymerization pressure is situated customarily in the region of atmospheric pressure, i.e., at ambient pressure, but may also be slightly above or below, in the range, for example, of 800 to 1500 mbar.

The polymerization medium may be composed either just of water or of mixtures of water and water-miscible liquids such as methanol. It is preferred to use just water.

In general it is advisable, after the end of the actual polymerization reaction, i.e., after the end of the addition of the monomers to be polymerized, or after a conversion of the monomers present in the polymerization reactor of at least 95%, to carry out a chemical and/or physical deodorization for the purpose of removing unpolymerized monomers. In general at least one chemical deodorization will be performed. A chemical deodorization is a postpolymerization phase which is initiated by adding at least one further polymerization initiator, more particularly one of the aforementioned redox initiator systems. Processes for doing this are known, from DE-A-4435422, DE-A-4435423, and DE-A-4419518, for example. The reduction in residual monomers can also be accomplished by combined measures of a chemical and physical deodorization, in which case the physical deodorization is preferably carried out after the chemical deodorization. The resulting polymer dispersions comprise preferably less than 1500 ppm, more particularly less than 1000 ppm, and more preferably less than 500 ppm of volatile organic components, TVOC. By TVOC (total volatile organic compounds) are meant all organic compounds having a boiling point of not more than 250° C. at 1 bar. The determination of the residual-volatile content is made typically in accordance with DIN55649.

It has additionally proven advantageous if the aqueous polymer dispersion, after it has been prepared, is stabilized by addition of an anionic surface-active substance.

Preferred for this purpose are the dialkyl esters of sulfosuccinic acid or their salts, more particularly the sodium salts, especially the dialkyl esters of sulfosuccinic acid having 6 to 12 C atoms per alkyl radical. Typically the aqueous polymer dispersion is admixed, following the emulsion polymerization, with 0.05% to 2% and more particularly with 0.1% to 1% by weight of an anionic surface-active substance of this kind.

In general the aqueous polymer dispersion will also be stabilized with a biocide.

The solids content of the aqueous polymer dispersions for use in accordance with the invention is typically from 30% to 80% by weight, preferably 40% to 75% by weight, and especially from 45% to 75% by weight.

The polymer particles that are present in the aqueous polymer dispersions used in accordance with the invention generally have a weight-average particle size of 0.05 to 1 µm, preferably of 0.1 to 0.8 µm, and more particularly of 0.1 to 0.6 µm. The particles may have either a monomodal particle size distribution, in other words a Gaussian distribution with only one maximum, or may have a polymodal distribution with at least two pronounced maxima, which differ generally by at least 0.05 µm.

For preparing the polymer dispersions with a polymodal distribution it is possible to draw on corresponding processes known from the prior art. For example, the afore-described process of a free-radical aqueous emulsion polymerization can be modified by adding a relatively large amount of emulsifier in the course of the polymerization, after some of the monomers have already undergone polymerization, and this initiates the formation of a new particle generation. One such process is known from EP 8775, for example. An alternative procedure is, at the beginning of the free-radical aqueous emulsion polymerization, first to introduce one particulate seed polymer 1, and then, in the course of the polymerization, to add at least one further seed polymer 2 in the form of an aqueous dispersion.

The in the polymers (P) used in accordance with the invention, which are present typically in dispersion or as powders, preferably have a weight-average molecular weight $M_w$ in the range from about 10 000 to 20 000 000 and preferably in the range from about 50 000 to 10 000 000. This determination of molar mass can be made by means of gel permeation chromatography using a standard, such as polymethyl methacrylate.

The glass transition temperature $T_g$ of the polymer (P) depends on the desired application and is generally in the range from −60° C. to 60° C., preferably in the range from −50° C. to 50° C., and more preferably in the range from −40° C. to 50° C.

The above-described aqueous polymer dispersions are especially suitable as a binder component in the binder compositions of the invention.

As well as a polymer (P) in the form of an aqueous dispersion or a powder, the binder composition of the invention further comprises boric acid and/or at least one salt of boric acid.

Salts of boric acid that are preferred in the context of this invention are salts of monoboric acid and of oligomeric boric acid having up to 20 boron atoms, such as, for example, the salts of diboric acid, triboric acid, tetraboric acid, pentaboric acid, hexaboric acid, decaboric acid or of dodecaboric acid. Preference is given to the alkali metal salts, more particularly the sodium salts. Equally preferred are the ammonium salts, alkylammonium salts, and hydroxyalkylammonium salts, as defined above, the alkyl radicals in the alkylammonium salts and in the hydroxyalkylammonium salts preferably having in each case not more than 8 and more particularly not more than 4 C atoms. Preferred alkylammonium salts and hydroxyalkylammonium salts are those containing in total not more than 10 and especially not more than 8 C atoms. Examples of salts of boric acid are more particularly $Na_3BO_3$, $Na_2HBO_3$, $Na_4B_2O_5$, boracite ($Mg_3[Cl|BO_3|B_6O_{10}]$), and borax ($Na_2[B_4O_5(OH)_4].8\,H_2O$).

The amount of boric acid and/or borate comprised in the binder compositions of the invention is generally 0.05% to 15% by weight, preferably 0.1% to 10% by weight, and especially 0.1% to 5% by weight, with respect to the polymer (P).

For the advantageous effect of the boric acid and/or of the borate, the pH of the binder composition of the invention is not critical. In general, however, the pH is situated in the range from 2 to 10.

The boric acid and/or borates may be added before, during or after the polymerization of the polymer (P). Alternatively they may also be added during the preparation of the binder composition.

For preparing an aqueous binder composition, the boric acid and/or the borates are added preferably to a polymer dispersion of the polymer (P) in solid form, in the form of a dispersion or a solution, and are distributed uniformly therein. The addition is made typically in solid form or as an aqueous solution. A solid binder composition is preferably obtained by drying an aqueous binder composition. In a further preferred procedure it is prepared by mixing a polymer (P) in powder form with boric acid and/or the borates.

Boric acid and borates give the binder composition of the invention properties that are advantageous for different fields of application. For example, the binder compositions, as described in more detail below, as a constituent of anticorrosion coating materials, enhance their anticorrosive action, and, as a constituent of adhesive formulations, enhance their adhesion and cohesion properties.

How the advantageous effects of the boric acid and the borates at a molecular level may be explained is of secondary importance for the invention. Nevertheless, it is thought that boric acid and borates enter into noncovalent interactions with functional groups of the polymer (P), more particularly with carboxyl, carboxamido, and hydroxyl groups. The interactions are thought to be based primarily on hydrogen bonds and ionic bonds. A boric acid or borate molecule, accordingly, is able to interact with two or more functional groups of the polymer (P) and hence develop a crosslinking action. It is further thought that the abovementioned advantageous properties of the binder compositions of the invention and also of the coating films obtainable from them can be attributed to the stated noncovalent interactions, which are, to a certain extent, reversible. Thus, for example, it is possible to imagine that the high hardness combined with high flexibility of the coating films formed from the surface coating materials of the invention derives from the reversible distribution of the crosslinking nodes, generated by boric acid or borates, in the polymer (P). In this case, boric acid and borates give the film first an advantageous hardness, by virtue of the crosslinking, and second a high flexibility and low susceptibility to fracture, by virtue of the capacity to part bonds at one point in the polymer and form them anew at another point.

The performance properties of coating films based on the binder compositions of the invention can be modified by varying the amount of boric acid and/or borate. For example, by optimizing the amount of borate, it is possible to maximize a specific property of surface coating materials, such as the adhesion of the coating to the substrate, for instance, or a weighting of different properties, such as adhesion and cohesion in an adhesive, for example, can be performed in accordance with the requirements.

The binder compositions of the invention are suitable for a multiplicity of applications in which aqueous polymer dispersions are typically used as binders, such as in paints, in paper coating slips, in leather coating systems and for mineral moldings, for example, in primers for coating metals, as binders in nonwovens production, as base materials for adhesive, as additives for hydraulically setting compositions such as plaster or concrete, as additives for clay or loam construction materials, for producing membranes, and the like.

The binder compositions of the invention, especially the aqueous versions, are employed preferably in aqueous surface coating materials. Accordingly the present invention further provides for the use of the here-described binder compositions in surface coating formulations.

The binder compositions that are employed in the surface coating materials comprise polymers (P) whose glass transition temperatures $T_g$ are situated typically in the range from 0° C. to 50° C., preferably in the range from 5° C. to 45° C., and more particularly in the range from 5° C. to 40° C.

Besides the binder compositions, the surface coating formulations may comprise further adjuvants, of the kind typical in surface coating materials based on aqueous polymer dispersions. These adjuvants include pigments, fillers, further auxiliaries, and, if appropriate, additional film-forming polymers.

Suitable pigments are, for example, inorganic white pigments such as titanium dioxide, preferably in the rutile form, barium sulfate, zinc oxide, zinc sulfide, basic lead carbonate, antimony trioxide, lithopones (zinc sulfide+barium sulfate) or colored pigments, examples being iron oxides, carbon black, graphite, zinc yellow, zinc green, ultramarine, manganese black, antimony black, manganese violet, Paris blue or Schweinfurt green. As well as the inorganic pigments, the emulsion paints of the invention may also comprise organic color pigments, examples being sepia, gamboge, Cassel brown, toluidine red, parared, Hansa yellow, indigo, azo dyes, anthraquinonoid and indigoida dyes, and also dioxazine, quinacridone, phthalocyanine, isoindolinone, and metal-complex pigments. Also suitable are synthetic white pigments with air inclusions for increasing the light scattering, such as the Rhopaque® dispersions.

Suitable fillers are, for example, aluminosilicates, such as feldspars, silicates, such as kaolin, talc, mica, magnesite, alkaline earth metal carbonates, such as calcium carbonate, in the form of calcite or chalk, for example, magnesium carbonate, dolomite, alkaline earth metal sulfates, such as calcium sulfate, silicon dioxide, etc. In surface coating materials, of course, finely divided fillers are preferred. The fillers can be used as individual components. In actual practice, however, filler mixtures have been found particularly appropriate, examples being calcium carbonate/kaolin, and calcium carbonate/talc. Glossy surface coating materials generally include only small amounts of very finely divided fillers, or comprise no fillers.

Finely divided fillers may also be used to increase the hiding power and/or to save on white pigments. For adjustment of the hiding power of the hue and of the depth of color, it is preferred to use blends of color pigments and fillers.

The typical auxiliaries, besides the emulsifiers used in the polymerization, also include wetting agents or dispersants, such as sodium, potassium or ammonium polyphosphates, alkali metal salts and ammonium salts of acrylic acid or maleic anhydride copolymers, polyphosphonates, such as sodium 1-hydroxyethane-1,1-diphosphonate, and salts of naphthalenesulfonic acids, more particularly their sodium salts.

Further suitable auxiliaries are flow control agents, defoamers, biocides, and thickeners. Examples of suitable thickeners are associative thickeners, such as polyurethane thickeners. The amount of the thickener is preferably less than 1% by weight, more preferably less than 0.6% by weight, based on the solids content of the surface coating material.

The fraction of pigments may be described through the pigment volume concentration (PVC). The PVC describes the ratio of the volume of pigments ($V_P$) and fillers ($V_F$) to the total volume, consisting of the volumes of binder ($V_B$), pigments, and fillers in a dried coating film, in percent: PVC= $(V_P+V_F) \times 100/(V_P+V_F+V_B)$ (cf. Ullmann's Enzyklopädie der technischen Chemie, 4th edition, Volume 15, p. 667). Surface coating materials can be divided up according to the PVC, for example, as follows:

| | |
|---|---|
| highly filled interior paint, wash resistant, white/matt | about ≧85 |
| interior paint, scrub resistant, white/matt | about 60-85 |
| semigloss paint, silk-matt | about 30-60 |
| semigloss paint, silk-gloss | about 25-35 |
| gloss paint | about 15-25 |
| exterior masonry paint, white | about 45-55 |
| clear varnish | 0 |

The surface coating materials of the invention can take the form, for example, of an unpigmented system (clear varnish) or of a pigmented system.

One subject of the invention concerns a surface coating material in the form of an aqueous composition comprising:
    at least one binder composition of the invention,
    at least one inorganic filler and/or at least one inorganic pigment,
    at least one typical auxiliary, and
    water.

Preference is given to a surface coating material comprising:
- 10% to 60% by weight of at least one binder composition of the invention,
- 10% to 70% by weight of inorganic fillers and/or inorganic pigments,
- 0.1% to 20% by weight of typical auxiliaries, and
- water to 100% by weight.

One embodiment of the present invention are surface coating materials in the form of an emulsion paint. Emulsion paints generally comprise 30% to 75% by weight and preferably 40% to 65% by weight of nonvolatiles. By these are meant all constituents of the formulation that are not water, but at least the total weight of binder, filler, pigment, low-volatility solvents (boiling point above 220° C.), plasticizers for example, and polymeric auxiliaries. Of these figures, the amounts accounted for by each of the constituents are as follows:
a) 3% to 90%, more particularly 10% to 60%, by weight by the polymer dispersion (PD) of the invention,
b) 0% to 85%, preferably 5% to 60%, more particularly 10% to 50%, by weight by at least one inorganic pigment,
c) 0% to 85%, more particularly 5% to 60%, by weight by inorganic fillers, and
d) 0.1% to 40%, more particularly 0.5% to 20%, by weight by typical auxiliaries.

The binder compositions of the invention are especially suitable for producing masonry paints having a PVC in the range from 30 to 65 or interior paints having a PVC in the range from 65 to 80. In addition they are especially suitable for producing semigloss or gloss paints which have, for example, a PVC in the range from 12% to 35%, preferably 15% to 30%.

The surface coating materials of the invention are produced in a known way by blending the components in mixing apparatus customary for the purpose. It has been found appropriate to prepare an aqueous paste or dispersion from the pigments, water, and, optionally, the auxiliaries, and only then to mix the polymeric binder, i.e., in general, the aqueous dispersion of the polymer, with the pigment paste or pigment dispersion.

The surface coating material of the invention can be applied to substrates in a usual way, as for example by spreading, spraying, dipping, rolling, knifecoating, etc.

The surface coating material of the invention is used preferably as an architectural coating material, i.e., to coat buildings or parts of buildings. The substrates in question may be mineral substrates such as renders, plaster or plasterboard, masonry or concrete, wood, woodbase materials, metal or paper, wallpapers for example, or plastic, PVC for example.

Preferred use is using the surface coating materials of the invention to coat interior parts of buildings, such as interior walls, interior doors, paneling, banisters, furniture, etc.

Likewise preferred is the use of the binder compositions of the invention to formulate anticorrosive surface coating materials, from which it is possible to produce surface coatings featuring improved corrosion control. The anticorrosive surface coating materials are suitable for use as corrosion-inhibiting primers. Alternatively they can be used, by application directly to the metal surface (direct-to-metal or DTM applications), in other words without prior application of a primer, to obtain surface coatings featuring good adhesion and high anticorrosive effect.

The surface coating materials of the invention are notable for ease of handling, good processing properties, and high hiding power. Moreover, the pollutant content of the surface coating materials is low. They have good performance properties, such as good water resistance, good wet adhesion, good blocking resistance, good recoatability, for example, and exhibit good flow on application. The surface coating materials are also outstandingly suitable for producing anticorrosive coatings.

The coatings produced from the surface coating materials of the invention feature a combination of good adhesion with good abrasion resistance. Said coatings, moreover, generally feature high flexibility and low fragility, which allows them, for example, to conform to a working substrate.

Furthermore, the binder compositions of the invention are employed preferably in adhesives. The present invention accordingly further provides for the use of the here-described binder compositions in adhesive formulations.

The adhesive formulations are produced preferably with aqueous binder compositions, and may be composed solely of these compositions. However, besides the aqueous binder compositions, the adhesive formulations may also comprise further adjuvants, of the kind customary in adhesives based on aqueous polymer dispersions. These adjuvants include fillers, colorants, including pigments, flow control agents, thickeners, biocides, and, optionally, further auxiliaries. Examples of such adjuvants have already been stated above. Further additives suitable for the adhesive formulations are, for example, setting retarders, such as sodium gluconate, for instance, and also tackifiers (tackifying resins). The adhesive formulations may further comprise additional, application-specific additives, such as cement in adhesives for tiles and similar floor- and wallcoverings, for example.

Tackifiers are, for example, natural resins, such as rosins, and derivatives prepared therefrom by disproportionation, isomerization, polymerization, dimerization or hydrogenation. They may be present in their salt form (with monovalent or polyvalent counterions, for example) or, preferably, in their esterified form. Alcohols used for the esterification may be monohydric or polyhydric. Examples are methanol, ethanediol, diethylene glycol, triethylene glycol, 1,2,3-propanethiol, pentaerythritol. Also used as tackifiers are hydrocarbon resins, examples being coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene, and vinyltoluene. Other tackifiers which can be used are polyacrylates which have a low molar weight. Preferably these polyacrylates have a weight-average molecular weight $M_w$ below 30 000. The polyacrylates are composed preferably of at least 60%, more particularly at least 80% by weight of $C_1$-$C_8$ alkyl(meth)acrylates. Preferred tackifiers are natural or chemically modified rosins. Rosins are composed predominantly of abietic acid or derivatives thereof. The amount by weight of the tackifiers is preferably 0 to 100 parts by weight, more preferably 0 to 50 parts by weight, per 100 parts by weight of polymer (solids/solids).

The adhesives of the invention may comprise one or more tackifiers or may be free from tackifier. If tackifiers have been added to them, they generally replace a portion of the polymer (P).

The aqueous polymer dispersions used for the adhesive formulations of the invention generally have a solids content of 45% to 80%, preferably of 50% to 75%, and more particularly of 55% to 72%, by weight.

The invention provides an adhesive in the form of an aqueous composition comprising:
- 20% to 70% by weight of at least one binder composition of the invention,
- 0% to 60% by weight of at least one inorganic filler and/or at least one inorganic pigment,
- 0% to 30% by weight of a further auxiliary, and
- water to 100% by weight.

The adhesives and binder compositions of the invention are suitable in principle for producing adhesive coatings on any desired substrates such as papers, plastics, PVC for example, mineral substrates such as renders, plaster or plasterboard, masonry or concrete, wood, woodbase materials or metal.

The thickness of the coating of pressure-sensitive adhesive is dependent on the desired application and is situated typically in the range from 1 to 500 µm, more particularly in the range from 2 to 250 µm or 5 to 200 µm, corresponding to a coating of 1 to 500 g/m², more particularly 2 to 250 g/m², and especially 5 to 200 g/m².

Application of the binder compositions and adhesives to the substrates that are to be coated may take place by means of typical methods, such as by rolling, knifecoating, spreading, pouring, etc., for example. It is also possible first to apply the polymer dispersions or pressure-sensitive adhesives to a release sheet, such as a release paper, for example, and to transfer the layer of pressure-sensitive adhesive with this release medium to the desired substrate. The water comprised in the compositions is typically removed in a customary manner, such as by drying at temperature in the range from 10 to 150° C., more particularly in the range from 15 to 100° C.

The adhesives and binder compositions of the invention are especially suitable for bonding flexible floorcoverings, such as textile floorcoverings, examples being carpets, linoleum, rubber, polyolefin, CV, and PVC coverings, and also rigid floor coverings, such as woodblock floorings, and tiles. They are therefore used preferably for bonding these floorcoverings to—in particular—the aforementioned mineral substrates or substrates of wood or woodbase materials.

The glass transition temperature $T_g$ of the polymers (P) used for the flooring adhesives of the invention is, in the case of the adhesives for flexible coverings, typically <−5° C., preferably <−10° C., and more particularly <−15° C., and, in the case of the adhesives for rigid coverings, woodblock flooring more particularly, is typically <20° C., preferably <15° C., and in particular <10° C.

The adhesives of the invention have very good adhesive properties, in particular a good adhesion to the substrates to be bonded, and a high cohesion (internal strength in the layer of adhesive). Furthermore, they are easy to handle and have good processing properties. With respect to the bonding of flexible floorcoverings, they are distinguished relative to prior-art adhesives by significantly increased peel strength in tandem with consistently good further properties, especially the wet grab and dry grab. In the context of their use as an adhesive for rigid floorcoverings, adhesives of the invention exhibit improved ultimate strength.

The inventive use of boric acid and/or borate for external polymer crosslinking also makes it possible to formulate the adhesives of the invention as storage-stable one-component formulations. In contrast, in the case of prior-art adhesives, the crosslinker that forms covalent bonds must be stored in a second, separate component, since it would otherwise lead to premature, irreversible curing.

For certain applications it is advantageous, rather than the aqueous binder composition of the invention, to use a solid binder composition in powder form, comprising a water-insoluble polymer (P) as herein defined, and boric acid or a salt of boric acid. Such powders may for example be prepared by removing water and, optionally, other volatile components from the aqueous binder composition, preferably by means of a conventional drying process for powder preparation, more particularly by a spray drying process. Alternatively an aqueous dispersion of the polymer can first be converted to a powder by a suitable drying process and, during or after the drying process, the powder can be admixed with the desired amount of boric acid or a salt thereof. These solid binder compositions in powder form are employed, for example, in cements, which they endow with advantageous physical properties, especially improved strength, such as tensile strength and breaking strength.

The examples which follow serve to illustrate the invention.

EXAMPLES

The light transmittance, (LT) was determined photometrically using a photometer on a 0.01% by weight dilution of the dispersion at 23° C.

The average particle diameters were determined by the method described by H. Cölfen, "Analytical Ultracentrifugation of Nanoparticles", in Encyclopedia of Nanoscience and Nanotechnology, (American Scientific Publishers, 2004), pp. 67-88, at 23° C. on a 0.1-0.5% by weight dilution (relative to solids content; light transmittance about 10%) of the polymer dispersion by means of an ultracentrifuge (Beckmann Model XL type) in a sedimentation field ramp from 600 to 40 000 rpm in accordance with an acceleration of 2250 to 150 000 g using a turbidity-based optical system (see also W. Mächtle and L. Börger in "Analytical Ultracentrifugation of Polymers and Nanoparticles", (Springer, Berlin, 2006), W. Mächtle in Analytical Ultracentrifugation in Biochemistry and Polymer Science: S. E. Härting et al. (editors), Cambridge: Royal Society of Chemistry, 1992, pp. 147-175, and in W. Machtle, Makromolekulare Chemie 185 (1984), pages 1025-1039). The diluent used was $D_2O$ with about 0.1 to 0.5 g/l, e.g., 0.5 g/l of Emulgator K30 (emulsifier: sodium salt of an alkanesulfonate).

The average particle diameters were also determined by means of hydrodynamic chromatography (HDC) using a particle size distribution analyzer (PSDA, Varian Deutschland GmbH) with a #2 cartridge (standard) at a wavelength of 254 nm. The temperature was 23° C. and the measuring time was 480 seconds.

The Brookfield viscosity was determined by a method based on DIN EN ISO 3219, using a rotational viscometer (Physica MCR 301 rheometer with sample changer and CC27 measuring system from Anton Paar) at 23° and a shear rate of 0 to 500 $sec^{-1}$). The figure given is the value at 100 $sec^{-1}$.

The dynamic-mechanical analysis (DMA) was performed using a rheometrics solids analyzer RSA II in a measuring-temperature range from −30° C. to +200° C., with a heating rate of 2° C./min and a frequency f of 1 Hz. For the dispersion films under measurement, the storage moduli E', the loss moduli E", and tan δ were ascertained (sample geometry: 34.5 mm length, 6.0 mm width, between 0.645 and 0.975 mm thickness). The measurements were represented in graph form by plotting E', E", and tan δ against the temperature. The glass transition temperature was determined from the E" graphs.

The glass transition temperature was determined by means of DMA or by the DSC method described in ASTM 3418/82, with determination of the mid point temperature.

I Preparation of the Polymer Dispersions
Ingredients:
  Biocide solution 1: Acticid MBS (Thor GmbH);
  Biocide solution 2: Acticid MV (Thor GmbH);
  Emulsifier solution 1: Dowfax® 2A1 (Dow Chemicals): alkyl diphenyl oxide disulfonate, 45% strength by weight solution;
  Emulsifier solution 2: $C_{13}$ oxo-process alcohol polyethoxylate with 8 ethylene oxide (EO) units;
  Emulsifier solution 3: sodium salt of fatty alcohol polyethylene glycol ether sulfate, 32-34% strength by weight solution;
  Emulsifier solution 4: sodium salt of lauryl ether sulfate, 27% strength by weight solution.

Preparation Example 1

Polymer Dispersion D1

A 2-liter polymerization vessel equipped with metering apparatus, stirrer, and temperature regulation was charged with 178.54 g of fully demineralized water (DI water hereinafter) and 6.36 g of polystyrene seed latex (with weight-average particle size of 30 nm). The initial charge was then heated with stirring to 95° C. and, maintaining this temperature, first 3.25 g of feed 2 were added, followed by metered addition of feed 1 and the remainder of feed 2 in parallel over the course of 2.75 hours with a constant feed rate. After the end of the feeds, the polymerization mixture was stirred for a further 15 minutes, and then 2.40 g of a 25% strength by weight aqueous ammonia solution and 7.00 g of DI water were added, and stirring was continued for 5 minutes more. Subsequently 3.60 g of a 10% strength by weight aqueous tert-butyl hydroperoxide solution and 12.40 g of DI water, and also 4.58 g of a 13.1% strength by weight aqueous acetone bisulfite solution and 11.42 g of DI water, were added over the course of 1 hour. The polymerization mixture was stirred for 15 minutes more and then cooled to 30° C. Then a mixture of 3.90 g of biocide solution 1 and 1.04 g of biocide solution 2, and afterward 7.80 g of 10% strength by weight aqueous sodium hydroxide solution, were added with stirring and the polymerization mixture was cooled to room temperature.

| Feed 1: | |
|---|---|
| 256.35 g | DI water |
| 8.00 g | emulsifier solution 1 |
| 24.00 g | emulsifier solution 2 |
| 7.80 g | acrylic acid |
| 18.00 g | 50% strength by weight aqueous solution of acrylamide |
| 336.00 g | n-butyl acrylate |
| 247.20 g | methyl methacrylate |
| Feed 2: | |
| 41.63 g | DI water |
| 0.72 g | sodium peroxodisulfate |

The resulting dispersion had a solids content of 51.1%, a pH of 7.8, and a glass transition temperature Tg of 8° C. The average particle diameter (volume average) was 209 nm, the light transmittance was 68%, and the viscosity was 205 mPas.

Preparation Example 2

Polymer Dispersion D2

A polymerization vessel equipped with metering apparatus, stirrer, and temperature regulation was charged with 504.00 g of DI water and 22.80 g of emulsifier solution 3. The apparatus was then flushed with nitrogen and the initial charge was heated with stirring to 85° C. Maintaining this temperature, 65.15 g of feed 1 and 4.63 g of feed 3 were added and stirring was continued for 10 minutes. Then the remainder of feed 1 was metered in over the course of 105 minutes and, in parallel, the remainder of feed 3 over the course of 183 minutes, with a constant feed rate. After feed 1, feed 2 was run in over the course of 60 minutes with a constant feed rate. After the end of feed 3, the polymerization mixture was stirred for 15 minutes more, and then 2.40 g of a 25% strength by weight aqueous ammonia solution and 18.00 g of DI water were added, and the batch was cooled to 65° C. with stirring. Subsequently, over the course of 60 minutes, 12.00 g of a 10% strength by weight aqueous tert-butyl hydroperoxide solution and 9.60 g of a 10% strength by weight aqueous ascorbic acid solution were metered in, and then 1.20 g of a 30% strength by weight aqueous hydrogen peroxide solution were run in over the course of 10 minutes. Thereafter 54.00 g of DI water were added, 12.00 g of a 25% strength by weight aqueous ammonia solution were metered in over the course of 10 minutes, and the batch was cooled. When a temperature of 35° C. was reached, 8.00 g of biocide solution 2 were run in.

| Feed 1: | |
|---|---|
| 282.35 g | DI water |
| 44.80 g | emulsifier solution 3 |
| 16.29 g | emulsifier solution 4 |
| 22.44 g | acrylic acid |
| 309.60 g | ethylhexyl acrylate |
| 410.40 g | styrene |
| Feed 2: | |
| 177.60 g | DI water |
| 18.00 g | emulsion solution 3 |
| 10.29 g | emulsion solution 4 |
| 7.44 g | acrylic acid |
| 176.40 g | ethylhexyl acrylate |
| 180.00 g | styrene |
| 93.60 g | ureidomethacrylate |
| Feed 3: | |
| 3.60 g | sodium peroxodisulfate |
| 47.83 g | DI water |

The resulting dispersion had a solids content of 50.1%, a glass transition temperature of about 22° C., and a pH of 7.4. The average particle diameter (by means of HDC) was 97 nm, the light transmittance was 83%, and the viscosity was 697 mPa·s.

Preparation Example 3

Polymer Dispersion D3

The polymer dispersion was prepared in the same way as in the process described above in preparation example 2, with the difference that feed 1 comprised additionally 1.92 g of tert-dodecyl mercaptan, and feed 2 comprised additionally 0.48 g of tert-dodecyl mercaptan.

The resulting dispersion had a solids content of 50.7%, a glass transition temperature of about 22° C. and a pH of 7.4. The average particle diameter (by means of HDF) was 95 nm and the light transmittance was 86%.

Example 1

Investigating the Crosslinking by Means of Tetraborate

To investigate the influence of borate on the film properties of polymer dispersions, aqueous binder compositions of the invention were prepared by adding different amounts of sodium tetraborate to the polymer dispersion D1. The films obtained from these mixtures were subjected to measurement by means of dynamic-mechanical analysis (DMA).

By addition of 6% to 10% strength by weight aqueous borax solution, samples of the polymer dispersion D1 with borax contents of 0.2%, 0.5%, and 1% by weight were prepared. The dispersion films of these samples, and also of a sample without borax, were subjected to measurement by DMA analysis. The E' values found for selected temperatures are listed in Table 1. The glass transition temperatures determined from the E" graphs are likewise listed in Table 1.

TABLE 1

|  | Storage modulus E' (×10$^5$ Pa) | | | $T_g$ (° C.) |
| --- | --- | --- | --- | --- |
|  | 20° C. | 150° C. | 200° C. |  |
| Comparative (0% by weight borax) | 407 | 1.90 | 0.881 | 8 |
| 0.2% by weight borax | 541 | 2.29 | 1.45 | 8 |
| 0.5% by weight borax | 565 | 3.61 | 2.12 | 11 |
| 1.0% by weight borax | 542 | 5.54 | 3.26 | 11 |

From Table 1 and FIG. 1 it is evident that the addition of borate at 20° C. produced weak crosslinking, which above about 60° C. became more marked and above 150° C. was strongly evident. As the borate content of the dispersion went up there was an increase in crosslinking. Within the measured range, the glass transition temperature initially rose somewhat as the borate content increased, and then reached a plateau.

II Application Examples

A Corrosion Control Coating Materials

Ingredients:
  defoamer A: Byk® 022 (Byk Chemie GmbH): based on a mixture of polysiloxanes and hydrophobic solids in polyglycol;
  emulsifier A: Lutensit® A-EP (BASF SE): acidic phosphoric acid monoester of alkoxylated $C_{13}$ and $C_{15}$ fatty alcohols with 18-20 alkylene oxide groups (ratio of the ethoxyl and propoxyl units about 2:1);
  red pigment A: Bayferrox 130 M (Lanxess GmbH): synthetic iron oxide, alpha-$Fe_2O_3$;
  filler A: talc 20 M2 (Finntalc): talc;
  filler B: lithopone 30% L (Sachtleben Chemie GmbH): based on co-precipitated zinc sulfide (about 30% by weight) and barium sulfate (about 70% by weight);
  corrosion inhibitor A: Heucophos® ZMP (Heubach GmbH): anticorrosive pigment based on a basic zinc-molybdenum orthophosphate hydrate;
  corrosion inhibitor B: corrosion inhibitor L1 (C.H. Erbslöh KG): formulation based on different corrosion-inhibiting components such as alkanolamines, borates, and phosphates;
  corrosion inhibitor C: Halox® Flash-X® 350 (C.H. Erbslöh KG): organic fly rust inhibitor;
  thickener A: Collacral® PU85 (BASF SE): approximately 25% strength by weight solution of a polyurethane in water/butyl diglycol (4:1).

Example 2

Corrosion Control Coating Material 1

The inventive formulations KS 1 and KS 2 and also the comparative formulations KS V, KS D2 and KS D3 were prepared in accordance with the formulas indicated in Table 2. For this purpose, first of all, the respective polymer dispersion was premixed with defoamer A in the presence of glass beads, using a dissolver (DISPERMAT®, VMA-Getzmann GmbH). To this mixture a solution of emulsifier A and ammonia in water was added, followed by a mixture of the remaining solvents. The mixture obtained was first left to swell, and then dispersed, following addition of a mixture of pigment and fillers. After that, corrosion inhibitor A, further defoamer A, and corrosion inhibitor B in water were added, and the suspension was treated on a roller bed. Finally, thickener A, butyl glycol, and further water were added and the formulation obtained was homogenized. The formulations prepared are typical corrosion control primers.

The inventive formulations KS 1 and KS 2 were prepared using the aqueous binder compositions WB 1 and WB 2, respectively:

WB 1: was prepared by admixing 60.0 g of boric acid (5 pphm) to the above-described polymer dispersion D3. The dispersion obtained had a solids content of 48.9% and a pH of 7.6.

WB 2: was prepared by admixing 84.0 g of disodium tetraborate (7 pphm) to the above-described polymer dispersion D3. The dispersion obtained had a solids content of 47.6% and a pH of 7.5.

The polymer dispersion V is an anionically stabilized, aqueous dispersion of a copolymer formed from methyl methacrylate, n-butyl acrylate, acrylic acid (1.3% by weight), and acrylamide (1.5% by weight), with a glass transition temperature of about 20° C.

TABLE 2

Coating formulations; unless specified otherwise, the numerical values are parts by weight.

| Polymer dispersion/ aqueous binder composition | KS 2 | KS 1 | KS D3 | KS D2 | KS V |
| --- | --- | --- | --- | --- | --- |
| V |  |  |  |  | 335.88 |
| D2 |  |  |  | 335.21 |  |
| D3 |  |  | 331.24 |  |  |
| WB 1 |  | 343.44 |  |  |  |
| WB 2 | 352.82 |  |  |  |  |
| Defoamer A | 1.32 | 1.32 | 1.32 | 1.32 | 1.32 |
| DI water | 35.16 | 35.16 | 35.16 | 35.16 | 35.16 |
| Emulsifier A | 0.36 | 0.36 | 0.36 | 0.36 | 0.36 |
| Ammonia, conc. | 6.60 | 6.60 | 6.60 | 6.60 | 6.60 |
| Phenoxypropanol | 4.32 | 4.32 | 4.32 | 4.32 | 4.32 |
| Mineral spirit 180°-210° C. | 4.32 | 4.32 | 4.32 | 4.32 | 4.32 |
| Red pigment A | 51.0 | 51.0 | 51.0 | 51.0 | 51.0 |
| Filler A | 21.60 | 21.60 | 21.60 | 21.60 | 21.60 |
| Filler B | 76.68 | 76.68 | 76.68 | 76.68 | 76.68 |
| Corrosion inhibitor A | 49.26 | 49.26 | 49.26 | 49.26 | 49.26 |
| Defoamer A | 1.14 | 1.14 | 1.14 | 1.14 | 1.14 |
| Corrosion inhibitor B/DI water (1:1) | 2.22 | 2.22 | 2.22 | 2.22 | 2.22 |
| Thickener A | 2.22 | 2.22 | 2.22 | 2.22 | 2.22 |
| Butyl glycol | 7.92 | 7.92 | 7.92 | 7.92 | 7.92 |
| Further DI water | 55 | 55 | 65 | 80 | 35 |
| pH | 8.5 | 8.4 | 8.5 | 8.4 | 9.6 |
| Viscosity (ICI Rotothinner (ball) at RT) [mPa*s] * | 530 | 550 | 610 | 470 | 400 |
| Pigment volume concentration (PVC) | 23% | 23% | 23% | 23% | 23% |

Performance Testing by Means of Salt Spray Test:

First of all the coating formulations under investigation were mixed with in each case about 0.8 part by weight of a 30% strength solution of corrosion inhibitor C in 15% ammonia. The resulting coating materials were knife-coated onto galvanized steel sheets (ST 1405). Each coating material was used to coat three plates. The coated sheets were stored at room temperature for 6 days and then at a temperature of 50° C. for 1 day. The dry film thickness of the coatings was in all cases more than 60 µm. 2 each of the 3 sample plates were given a scratch track down to the steel substrate, which ran at a distance of 30 mm parallel to one of the long sides of the sheets, the scratch width being 0.5 mm. Salt spray mist exposure took place in accordance with DIN EN ISO 7253 at 35° C., with a 5% strength by weight NaCl solution, over a period of 696 hours. Subsequently, changes were evaluated visually:

sub-film creep at the scratch mark.
blistering both at the scratch and over the surface, according to DIN EN ISO 4628-2. Here, the number of blisters was evaluated on a scale from M 0 for no blisters, to M 5, for a very large number of blisters, with M 1, M 2, M 3 and M 4 identifying corresponding gradations. The size of the blisters was evaluated on a scale from S 1, for very small blisters, to S 5, for very large blisters, with S 2, S 3 and S 4 identifying corresponding gradations.
delamination of the coating from the substrate at the scratch.
sub-film corrosion at the scratch.
adhesive strength: the adhesive strength test was carried out by means of a cross-cut test in accordance with DIN EN ISO 2409, using a cutting instrument in a cut spacing of 1 mm. The adhesion was evaluated on a scale from Gt 0, for no delamination to Gt 5, for complete delamination, with Gt 1, Gt 2, Gt 3 and Gt 4 identifying corresponding gradations. The value reported first in Table 3 in each case refers to the testing directly after the salt spray test in the wet state, and the second value in each case refers to the testing after 24 hours in the dry state. The results are compiled in Table 3.

TABLE 3

| | | Salt spray test | | | |
|---|---|---|---|---|---|
| | | KS 2b | KS 2a | KS V2 | KS V1 | KS V |
| Scratch mark | Creep [mm] | 0 | 0 | Not recognized | Not recognized | Not recognized |
| | Blisters [mm] | 1.5-25 | 12-23 | 15-25 | 2-25 | 15-26 |
| | Blisters [amount/size] | M 5 S 4-5 | M 5 S 4-5 | M 5 S 4-5 | M 5 S 4-5 | M 5 S 3 |
| | Delamination [mm] | 8-18 | 13-18 | 10-25 | 6.5-25 | 16-23 |
| | Sub-film corrosion [mm] | 8-18 | 13-18 | 10-25 | 2-25 | 16-23 |
| Surface | Blisters | M 5 | M 5 | M 5 | M 5 | SM 5 |
| | [amount/size] | S 4- | S 4- | S 4- | S 3-4 | S 3 |
| | Cross-cut | Gt 0-1/1-2 | Gt 0-1/1-2 | Gt 0-2/1-2 | Gt 0-3/1-2 | Gt 5/5 |

In the salt spray test, the corrosion control coatings KS 2a and KS 2b, based on the binders of the invention, exhibit less blistering and also reduced delamination and subfilm corrosion.

B Floorcovering Adhesives

Ingredients:

defoamer I: Agitan® 282 (Münzing Chemie GmbH): combination of liquid hydrocarbons, hydrophobic silica, synthetic copolymers, and nonionic emulsifiers;

defoamer II: Lumiten® N-OG (BASF SE): solution of nonionic fatty alcohol ethoxylates;

Na gluconate: setting retarder (Merck-Schuchardt)

dispersing assistant I: Pigmentverteiler NL (BASF SE): 35% strength by weight aqueous solution of a sodium polyacrylate;

filler I: Ulmer Weiss XM (Eduard Merkle GmbH & Co.): calcium carbonate;

thickener I: Latekoll D® (BASF SE): anionic dispersion of acrylic acid-acrylic ester copolymers;

resin melt: mixture consisting of: 55 parts by weight of noncrystallizing, polymerized rosin (Dercol® M 10 B, DIAMANTINO MALHO & $C^a$), 35 parts by weight of resin ester (Bremasin 1205, Robert Kraemer GmbH & Co. KG) and 10 parts by weight of polypropylene glycol (Pluriol® P 600 BASF SE);

emulsifier I: Emulphor® FAS 30 (BASF SE): 30% strength by weight solution of fatty alcohol ether sulfate sodium salts;

wetting agent I: Emulan® HE 50 (BASF SE): alcohol ethoxylates.

Example 3

Floorcovering Adhesives

Preparation of the Adhesive Formulations:

The inventive adhesive formulations I and II were prepared in accordance with the formulas I and II specified below, by mixing polymer dispersions, fillers, tackifiers if appropriate, and further additives. Corresponding comparative formulations I-V and II-V, which comprise no borax but are otherwise identical with the formulations I and II, were likewise prepared.

| Formula I: | |
|---|---|
| | parts by weight |
| Dispersion A (see below) | 53.0 |
| Borax | 0.53 |
| Defoamer I | 0.1 |
| Defoamer II | 0.1 |
| Na gluconate | 0.5 |
| Dispersing assistant I | 0.5 |
| Filler I | 45.0 |
| Thickener I | 0.8 |

Dispersion A: conventional polymer dispersion prepared by emulsion polymerization of 71.9% by weight, based on the total amount of monomers, of n-butyl acrylate, 25% by weight of ethylhexyl acrylate, 3% by weight of methacrylic acid, and 0.1% by weight of acrylamide. Glass transition temperature: −44° C., pH: 7 to 7.5, solids content: 69%.

| Formula II: | |
|---|---|
| | parts by weight |
| Dispersion B (see below) | 35.5 |
| Borax | 0.36 |
| Thickener I, 4% strength by weight solution | 10.0 |
| Resin melt | 15.0 |
| Emulsifier I | 1.0 |

-continued

Formula II:

| | parts by weight |
|---|---|
| Defoamer I | 0.2 |
| Dispersing assistant I | 1.0 |
| Wetting agent I | 0.2 |
| Filler I | 37.1 |

Dispersion B: conventional polymer dispersion prepared by emulsion polymerization of 87.5% by weight, based on the total amount of monomers, of n-butyl acrylate, 10% by weight of acrylonitrile and 2.5% by weight of acrylic acid. Glass transition temperature: −22° C., solids content: 62%; the dispersion was adjusted with aqueous ammonia to a pH of 7.5.

Performance Tests

1. Wet Grab (WG)

The substrates, fiber cement panel (500×200 mm) and needlefelt floorcovering (200×50 mm NFC strip), along with the adhesive, were conditioned under standard conditions (23° C., 50% relative humidity) for at least 24 hours. The adhesive was applied using a standardized peel coater (toothed bar, TKB B 1) in draw down direction to the fiber cement panel, and, after 15 minutes of evaporation, the needlefelt floorcoverings (NFC strips) were layed into the bed of adhesive by their reverse side, and were pressed on with a 2.5 kg roller by rolling back and forth 3 times. At the stated intervals of time, the coverings were then peeled off using a peel instrument, and the increase in the peel removal resistance was ascertained in N/5 cm. The test speed was 725 mm/minute. For evaluation, the average from 2 test specimens was formed, in N/5 cm, and the fracture mode was assessed visually. The results are listed in Table 4.

TABLE 4

Wet grab; numerical values indicate the peel resistance in N/5 cm.

| Timespan after pressing on | Adhesive I | Adhesive I-V | Adhesive II | Adhesive II-V |
|---|---|---|---|---|
| 10 min | 4 cohesive fracture | 3 cohesive fracture | 2 cohesive fracture | 2 cohesive fracture |
| 15 min | 6 cohesive fracture | 9 cohesive fracture | 4 cohesive fracture | 4 cohesive fracture |
| 20 min | 12 cohesive fracture | 14 cohesive fracture | 10 cohesive fracture | 8 cohesive fracture |
| 30 min | 23 cohesive fracture | 26 cohesive fracture | 17 cohesive fracture | 22 cohesive fracture |

There is only a slight change in the setting behavior of the two adhesive formulations I and II as a result of adding borax; however, the setting behavior is impaired slightly for longer setting times.

2. Dry Grab (DG)

The substrates, fiber cement panel (500×200 mm) and Pegulan B 1 test covering (200×50 mm), along with the adhesive, were conditioned under standard conditions (23° C., 50% relative humidity) for at least 24 hours. The adhesive was applied using a standardized shear coater (toothed bar, TKB A 2) in draw down direction to the fiber cement panel, and, after 20 to 40 minutes of evaporation, the PVC strips were layed into the bed of adhesive by their reverse side, and were pressed on with a 2.5 kg roller by rolling back and forth 3 times. Testing took place immediately after bonding, by peeling with the removal apparatus, and the peel resistance was determined, in N/5 cm. The test speed was 725 mm/minute. For evaluation, the average from 2 test specimens was formed, in N/mm, and the fracture mode was assessed visually. The results are listed in Table 5.

TABLE 5

Dry grab; numerical values indicate the peel resistance in N/5 cm.

| Evaporation times | Adhesive I | Adhesive I-V | Adhesive II | Adhesive II-V |
|---|---|---|---|---|
| 20 min | 2 cohesive fracture | 2 cohesive fracture | 0 cohesive fracture | 1 cohesive fracture |
| 25 min | 9 cohesive fracture | 6 cohesive fracture | 6 cohesive fracture | 8 cohesive fracture |
| 30 min | 10 adhesive fracture | 10 cohesive fracture with adhesive fracture for about 30% of the area | 14 cohesive fracture with adhesive fracture for about 30% of the area | 11 Cohesive fracture with adhesive fracture for about 30% of the area |
| 40 min | 5 adhesive fracture | 4 adhesive fracture | 10 adhesive fracture | 7 adhesive fracture |

The "open time", in other words the period of time within which the bond must be performed, is somewhat longer for adhesive II than for the comparative adhesive II-V without borate. In the case of adhesive I, in contrast, the addition of borate had virtually no effects on the open time.

3. Dynamic Peel Strength, According to EN 1372

In deviation from EN 1372, the substrates were first degreased with isopropanol. The substrates, fiber cement panel (150×50 mm) and elastic floorcovering (200×50 mm), along with the adhesive, were conditioned under standard conditions (23° C., 50% relative humidity) for at least 24 hours. The adhesive was applied using a standardized applicator (toothed bar TKB B 1 for textile coverings and linoleum, and toothed bar TKB A 2 for PVC and polyolefin) in longitudinal direction to the fiber cement panel, with an angle of attack of 70°. The floorcovering was adhered by its reverse face to the fiber cement panel in such a way that 3 sides are flush and the covering overhangs on one side. After 10 and 30 minutes of evaporation, the test covering was pressed on with a 3.5 kg pressing roller, by rolling once backward and forward over the length of the test specimen, without exertion of additional pressure. The test specimens were stored for 2 days or 14 days under standard conditions, after which the peeling was conducted at an angle of 90° and a test speed of 100 mm/minute. For evaluation, the average of 5 test specimens was formed, in N/mm, and the fracture mode was assessed visually. The results are listed in Table 6.

TABLE 6

Peel strength; with adhesives I and I-V, PVC was bonded, and with adhesive II and II-V, rubber ("Norament" covering from Freudenberg) was bonded; numerical values indicate the peel resistance in N/mm.

| Evaporation time, storage time | | Adhesive I | Adhesive I-V | Adhesive II | Adhesive II-V |
|---|---|---|---|---|---|
| 10 min, 2 days | AV* | — | — | 2.70 | 2.14 |
| | S* | — | — | 0.26 | 0.29 |
| | FM* | — | — | cohesive fracture with | cohesive fracture with |

TABLE 6-continued

Peel strength; with adhesives I and I-V, PVC was bonded, and with adhesive II and II-V, rubber ("Norament" covering from Freudenberg) was bonded; numerical values indicate the peel resistance in N/mm.

| Evaporation time, storage time | | Adhesive I | Adhesive I-V | Adhesive II | Adhesive II-V |
|---|---|---|---|---|---|
| | | | | adhesive fracture over about 30% of the surface | adhesive fracture over about 30% of the surface |
| 10 min, 14 days | AV* S* FM* | 1.81 0.05 adhesive fracture at the PVC | 1.48 0.22 adhesive fracture at the PVC | 1.84 0.21 adhesive fracture | 1.38 0.13 adhesive fracture |
| 30 min, 14 days | AV* S* FM* | 1.23 0.24 adhesive fracture at the PVC | 0.72 0.13 adhesive fracture at the PVC | — — — | — — — |

*AV: average value from 5 measurements; S: standard deviation; FM: fracture mode.

The results demonstrate that the peel strength of the inventive adhesives I and II is increased significantly relative to the comparative adhesives I-V and II-V which comprise no borate.

4. Storage Stability of the Dispersion-based Adhesives: Testing of the Brookfield Viscosity The adhesive was first conditioned under standard conditions (23° C., 50% relative humidity) for 3 hours. Sufficient sample quantities of the dispersion-based adhesive under test were stored in tightly sealed glass bottles under standard conditions (SCO) or at 50° C. in a drying cabinet. After the stated intervals of time, the viscosity was measured using a Brookfield viscometer (model RVT, with "spindle 6" test element; setting: 20 rpm). As a comparison, a viscosity measurement was carried out before storage of the samples. The results are listed in Table 7.

TABLE 7

Storage stability; viscosities in mPa*s.

| Storage | | Adhesive I | Adhesive I-V | Adhesive II | Adhesive II-V |
|---|---|---|---|---|---|
| SCO | Comparative | 29400 | 29600 | 36800 | 29900 |
| | 1 day | 34400 | 35000 | 35800 | 28300 |
| | 4 days | 32800 | 30800 | 28400 | 22500 |
| | 7 days | 33200 | 35100 | 29800 | 25450 |
| | 14 days | 35000 | 38000 | 28000 | 22100 |
| | 28 days | 36100 | 33500 | 27000 | 21800 |
| 50° C. | 4 days | 28900 | 32600 | 19000 | 19650 |
| | 7 days | 34000 | 34650 | 21550 | 19700 |
| | 14 days | 37700 | 36400 | 20400 | 18650 |
| | 28 days | 36100 | 35700 | 19800 | 18900 |

In spite of the addition of borax as a crosslinker, the viscosity of the two inventive adhesives I and II climbs only slightly in comparison to the comparative formulations without borax. This excellent storage stability means that adhesives of the invention can be used in one-component formulations. This is a great advantage over using common adhesives with prior-art crosslinkers, especially those which form covalent bonds.

5. Film Mechanics and Film Stretch

To form a coating film, the dispersion under investigation was poured through a brass sieve (mesh size 0.16 mm) without bubbles into a film plate (made of silicone rubber, internal dimensions 145 mm×145 mm×5 mm) and distributed uniformly. Depending on viscosity, the dispersion was diluted beforehand, if appropriate, with a little water. The initial mass of dispersion was selected so as to give a film approximately 1 mm thick (for example, an initial mass of about 46 g in the case of a dispersion with a solids content of 50%). The plate thus prepared was then dried for more than 4 days under standard conditions in a plate storage rack. The dry film was then taken from the plate, and 5 test dumb bells with a test length of 40 mm and a test width of 4 mm were punched out (in accordance with DIN 53 455). The thickness of the test specimen was measured using a micrometer. The test specimen was then stretched to fracture using a tensile testing machine, with a speed of 200 mm/min. For the purpose of evaluation, determinations were made of the maximum stress ($F_{max}$) in N/mm$^2$, the extension at maximum stress ($S_{Fmax}$) in %, the breaking stress ($F_{Smax}$) in N/mm$^2$, the breaking extension ($S_{max}$) in %, and the stresses at 300%, 500%, 700%, 1200%, and 2400% extension ($F_{x\%S}$) in N/mm$^2$. The results are listed in Table 8. The values specified are the average values from three separate determinations.

TABLE 8

Film-mechanical properties

| | Dispersion A, pH = 9.5 with 1% borax (solids/solids) | Dispersion A | Dispersion B, pH = 9.5 with 1% borax (solids/solids) | Dispersion B |
|---|---|---|---|---|
| $F_{max}$ [N/mm$^2$] | 0.08 | 0.11 | 0.16 | 0.18 |
| $S_{Fmax}$ [%] | 1478 | 721 | 1858 | 1947 |
| $F_{Smax}$ [N/mm$^2$] | 0.01 | 0.05 | 0.08 | 0.14 |
| $S_{max}$ [%] | 1809 | 1288 | >3000 | >3000 |
| $F_{300\%\,S}$ [N/mm$^2$] | 0.04 | 0.08 | 0.10 | 0.11 |
| $F_{500\%\,S}$ [N/mm$^2$] | 0.05 | 0.10 | 0.11 | 0.13 |
| $F_{700\%\,S}$ [N/mm$^2$] | 0.06 | 0.11 | 0.13 | 0.14 |
| $F_{1200\%\,S}$ [N/mm$^2$] | 0.08 | 0.07 | 0.15 | 0.17 |
| $F_{2400\%\,S}$ [N/mm$^2$] | — | — | 0.16 | 0.18 |

In the case of dispersion B, the film-mechanical properties remain virtually unchanged by comparison with the borax-free comparative. In contrast, the addition of borax to dispersion A brought about approximately a doubling of the extension at maximum stress, and also an increase in the breaking extension, which suggests significantly increased flexibility and reduced fracture tendency. This can probably be attributed to the fraction of acrylamide in this dispersion.

The invention claimed is:

1. An aqueous binder composition, comprising:
   a) a water-insoluble polymer in the form of dispersed polymer particles having a glass transition temperature in a range from −50° C. to 50° C., obtained by free-radical polymerization of ethylenically unsaturated monomers M, the monomers M comprising:
      a1) 80% to 99.9% by weight, based on a total amount of monomers M, of at least one neutral, monoethylenically unsaturated monomer M1 of low water-solubility; and
      a2) 0.1% to 15% by weight, based on the total amount of monomers M, of at least one monoethylenically unsaturated monomer M2 which comprises at least one selected from the group consisting of a carboxyl group and a carboxamido group ($CONH_2$); and
   b) at least one selected from the group consisting of boric acid and a salt of boric acid.

2. The composition of claim 1, wherein a weight-average particle size of the polymer particles is in a range from 0.05 to 1 μm.

3. The composition of claim 1, wherein the monomer M1 is at least one selected from the group consisting of an ester of an α,β-ethylenically unsaturated monocarboxylic acid with a $C_1$-$C_{30}$ alkanol, a diester of an α,β-ethylenically unsaturated dicarboxylic acids with at least one $C_1$-$C_{30}$ alkanol, an ester of vinyl alcohol with a $C_1$-$C_{30}$ monocarboxylic acid, an ester of allyl alcohol with a $C_1$-$C_{30}$ monocarboxylic acid, a vinylaromatic, an amide of an α,β-unsaturated monocarboxylic acid with a $C_1$-$C_{30}$ alkylamine, an amide of an α,β-unsaturated monocarboxylic acid with a di-$C_1$-$C_{30}$ alkylamine, and a diamide of an α,β-ethylenically unsaturated dicarboxylic acid with at least one of a $C_1$-$C_{30}$ alkylamine, a diamide of an α,β-ethylenically unsaturated dicarboxylic acid with at least one di-$C_1$-$C_{30}$ alkylamine, and a diamide of an α,β-ethylenically unsaturated dicarboxylic acid with at least one of a $C_1$-$C_{30}$ alkylamine and a di-$C_1$-$C_{30}$ alkylamine.

4. The composition of claim 1, wherein the monomer M2 comprises at least one monomer comprising at least one carboxyl group.

5. The composition of claim 4, wherein the monomer comprising at least one carboxyl group is at least one selected from the group consisting of a monoethylenically unsaturated $C_3$-$C_8$ monocarboxylic acid and a monoethylenically unsaturated $C_3$-$C_8$ dicarboxylic acid.

6. The composition of claim 1, wherein the monomer M2 comprises at least one monomer comprising at least one carboxamido group.

7. The composition of claim 6, wherein the monomer comprising at least one carboxamido group is at least one primary amide of a monoethylenically unsaturated $C_3$-$C_8$ monocarboxylic acid.

8. The composition of claim 1, wherein the monomers M further comprise at least one monomer M3 which is selected from the group consisting of a hydroxy-$C_2$-$C_4$ alkyl ester of a monoethylenically unsaturated monocarboxylic acid, a monoester of a monoethylenically unsaturated carboxylic acid with a polyoxy-$C_2$-$C_4$ alkylene ether, and a monoethylenically unsaturated monomer comprising at least one urea group.

9. The composition of claim 1, wherein the water-insoluble polymer of component a) is obtained by free-radical aqueous emulsion polymerization.

10. The composition of claim 1, wherein component b) is at least one selected from the group consisting of boric acid, an alkali metal salt of boric acid, an alkaline earth metal salt of boric acid, an ammonium salt of boric acid, an alkylammonium salt of boric acid, a hydroxyalkylammonium salt of boric acid, an oligoboric acid having up to 20 boron atoms, an alkali metal salt of an oligoboric acid having up to 20 boron atoms, an alkaline earth metal salt of an oligoboric acid having up to 20 boron atoms, an ammonium salt of an oligoboric acid having up to 20 boron atoms, an alkylammonium salt of an oligoboric acid having up to 20 boron atoms, and a hydroxyalkylammonium salt of an oligoboric acid having up to 20 boron atoms.

11. The composition of claim 1, comprising component b) in an amount of 0.1% to 10% by weight, based on the water-insoluble polymer.

12. A solid binder composition, comprising:
in the form of a powder, a water-insoluble polymer
a) a water-insoluble polymer in the form of dispersed polymer particles having a glass transition temperature in a range from −50° C. to 50° C., obtained by free-radical polymerization of ethylenically unsaturated monomers M, the monomers M comprising:
a1) 80% to 99.9% by weight, based on a total amount of monomers M, of at least one neutral, monoethylenically unsaturated monomer M1 of low water-solubility, and
a2) 0.1% to 15% by weight, based on the total amount of monomers M, of at least one monoethylenically unsaturated monomer M2 which comprises at least one selected from the group consisting of a carboxyl group and a carboxamido group ($CONH_2$); and
b) at least one selected from the group consisting of boric acid and a salt of boric acid.

13. A solid binder composition in powder form, obtained by drying the composition of claim 1.

14. A process for preparing the composition of claim 1, comprising
A) preparing an aqueous dispersion of the water-insoluble polymer having a glass transition temperature in a range from −50° C. to 50° C. by free-radical polymerization of the ethylenically unsaturated monomers M, to obtain a polymer dispersion; and
B) adding at least one selected from the group consisting of boric acid and a salt of boric acid, to the polymer dispersion obtained in A), or during the preparing.

15. A method of modifying at least one property of an adhesive, the method comprising combining at least one selected from the group consisting of boric acid and a salt of boric acid to the adhesive,
wherein the adhesive comprises a water-insoluble polymer obtained by free-radical polymerization of ethylenically unsaturated monomers M, the monomers M comprising:
80% to 99.9% by weight, based on a total amount of monomers M, of at least one neutral, monoethylenically unsaturated monomer M1 of low water-solubility; and
0.1% to 15% by weight, based on the total amount of monomers M, of at least one monoethylenically unsaturated monomer M2 which comprises at least one selected from the group consisting of a carboxyl group and a carboxamido group ($CONH_2$).

16. The method of claim 15, wherein the water-insoluble polymer is obtained by free-radical aqueous emulsion polymerization.

17. The method of claim 15, wherein the property is an adhesion or cohesion property of the adhesive.

18. The method of claim 15, wherein the adhesive is a floorcovering adhesive or a tile adhesive.

19. The method of claim 18, wherein the adhesive is a floorcovering adhesive, suitable for a flexible floorcovering.

20. The method of claim 18, wherein the adhesive is a floorcovering adhesive, suitable for a rigid floorcovering.

21. A method of modifying at least one property of a polymer-bound coating, the method comprising combining at least one selected from the group consisting of boric acid and a salt of boric acid, with the polymer-bound coating,
wherein the polymer-bound coating comprises as binder a water-insoluble polymer obtained by free-radical polymerization of ethylenically unsaturated monomers M, the monomers M comprising:
80% to 99.9% by weight, based on a total amount of monomers M, of at least one neutral, monoethylenically unsaturated monomer M1 of low water-solubility; and
0.1% to 15% by weight, based on the total amount of monomers M, of at least one monoethylenically unsaturated monomer M2 which comprises at least one selected from the group consisting of a carboxyl group and a carboxamido group ($CONH_2$).

22. The method of claim 21, wherein the water-insoluble polymer is obtained by free-radical aqueous emulsion polymerization.

23. The method of claim 21, wherein the property is at least one selected from the group consisting of adhesion, abrasion resistance, hardness, and blocking resistance, of a coating film from the polymer-bound coating.

24. A method of manufacturing a surface coating material, the method comprising combining with the coating material the composition of claim 1.

25. The method of claim 24, wherein the surface coating material is suitable for coating a metallic surface.

26. A method of manufacturing adhesive, comprising combining the adhesive with the composition of claim 1.

27. A method of manufacturing a cement, comprising combining the cement with the composition of claim 1.

28. A surface coating material, comprising the composition of claim 1.

29. An adhesive, comprising the composition of claim 1.

30. A cement, comprising the composition of claim 1.

* * * * *